US010205736B2

(12) United States Patent
Rieke et al.

(10) Patent No.: US 10,205,736 B2
(45) Date of Patent: Feb. 12, 2019

(54) BEHAVIORAL BASELINING OF NETWORK SYSTEMS

(71) Applicant: Catbird Networks, Inc., Scotts Valley, CA (US)

(72) Inventors: Malcolm Rieke, Santa Cruz, CA (US); Holland Carrere Barry, Scotts Valley, CA (US)

(73) Assignee: CATBIRD NETWORKS, INC., Scotts Valley, CA (US)

( * ) Notice: Subject to any disclaimer, the term of this patent is extended or adjusted under 35 U.S.C. 154(b) by 97 days.

(21) Appl. No.: 15/443,857

(22) Filed: Feb. 27, 2017

(65) Prior Publication Data

US 2018/0248899 A1    Aug. 30, 2018

(51) Int. Cl.
*G06F 21/31* (2013.01)
*H04L 29/06* (2006.01)
(Continued)

(52) U.S. Cl.
CPC ........ *H04L 63/1425* (2013.01); *G06F 3/0482* (2013.01); *G06F 21/31* (2013.01); *H04L 63/1433* (2013.01); *G06F 17/30* (2013.01)

(58) Field of Classification Search
CPC ............. H04L 63/1425; H04L 63/1433; G06F 3/0482; G06F 21/31; G06F 17/30
See application file for complete search history.

(56) References Cited

U.S. PATENT DOCUMENTS 5,657,470 A    8/1997  Fisherman et al.
7,668,925 B1   2/2010  Liao et al.
(Continued)

FOREIGN PATENT DOCUMENTS

EP    0973350    1/2000
EP    2753069    7/2014
WO    2016036485  3/2016

OTHER PUBLICATIONS

Fangfang Zhou, Ronghua Shi, Ying Zhao, Yezi Huang, Xing Liang; NetSecRadar—A Visualization System for Network Security Situational Awareness, Cyberspace Safety and Security Symposium 2013, p. 403-416, LNCS (Nov. 13-15, 2013).

(Continued)

*Primary Examiner* — Beemnet W Dada
(74) *Attorney, Agent, or Firm* — Greenberg Traurig, LLP

(57) ABSTRACT

Systems and methods for behavioral baselining of network systems. In one embodiment, a method includes: storing, in an asset attribute database, information regarding assets, wherein each asset comprises at least one attribute; storing, in a relationship database, information regarding relationships, wherein each relationship comprises at least one attribute; selecting, from the asset attribute database, assets based on at least one attribute value; selecting, from the relationship database, one or more relationships based on at least one attribute value, the selected relationships including a first relationship; creating a baseline, wherein the baseline comprises the selected assets and the selected relationships; connecting a first event stream to the baseline, wherein the first event stream comprises a set of events, and each event comprises attributes; and detecting a drift from the baseline, wherein the drift is determined using the first event stream and is based on a failure of at least one attribute value in a first event of the first event stream to match at least one attribute value of the first relationship.

22 Claims, 29 Drawing Sheets

(51) Int. Cl.
*G06F 3/0482* (2013.01)
*G06F 17/30* (2006.01)

(56) References Cited

U.S. PATENT DOCUMENTS

| | | | |
|---|---|---|---|
| 7,711,979 | B2 | 5/2010 | Salli |
| 7,779,226 | B2 | 8/2010 | Kita |
| 7,849,497 | B1 | 12/2010 | Hurst et al. |
| 7,886,351 | B2 | 2/2011 | Dadhia et al. |
| 8,116,226 | B1 | 2/2012 | Liao et al. |
| 8,166,554 | B2 | 4/2012 | John |
| 8,205,035 | B2 | 6/2012 | Reddy et al. |
| 8,214,889 | B2 | 7/2012 | Bahl et al. |
| 8,321,944 | B1 | 11/2012 | Mayer et al. |
| 8,478,723 | B2 | 7/2013 | Rousseau |
| 8,832,835 | B1 | 9/2014 | Chen et al. |
| 9,009,319 | B2 | 4/2015 | Carlin et al. |
| 9,049,105 | B1 * | 6/2015 | Feinstein ............ H04L 41/069 |
| 9,088,541 | B2 | 7/2015 | Rieke et al. |
| 9,189,395 | B2 | 11/2015 | Na |
| 9,195,484 | B1 | 11/2015 | Ward, Jr. |
| 9,485,279 | B2 | 11/2016 | Kimer et al. |
| 9,509,574 | B2 | 11/2016 | Kimer et al. |
| 9,509,660 | B2 | 11/2016 | Rieke et al. |
| 9,553,768 | B2 | 1/2017 | Scott et al. |
| 9,923,909 | B2 * | 3/2018 | Lietz ..................... H04L 63/14 |
| 2004/0075675 | A1 | 4/2004 | Raivisto et al. |
| 2004/0078105 | A1 | 4/2004 | Moon et al. |
| 2004/0243707 | A1 | 12/2004 | Watkinson |
| 2004/0255269 | A1 | 12/2004 | Santori et al. |
| 2005/0050351 | A1 | 3/2005 | Cain |
| 2005/0125389 | A1 | 6/2005 | Hazzard et al. |
| 2005/0268335 | A1 | 12/2005 | Le et al. |
| 2006/0021034 | A1 | 1/2006 | Cook |
| 2007/0118909 | A1 | 5/2007 | Hertzog et al. |
| 2007/0143827 | A1 | 6/2007 | Nicodemus et al. |
| 2008/0134286 | A1 | 6/2008 | Amdur et al. |
| 2008/0201458 | A1 | 8/2008 | Salli |
| 2008/0270606 | A1 | 10/2008 | Gooch et al. |
| 2008/0301765 | A1 | 12/2008 | Nicol et al. |
| 2009/0267946 | A1 | 10/2009 | Agutter et al. |
| 2009/0288135 | A1 | 11/2009 | Chang et al. |
| 2009/0327903 | A1 | 12/2009 | Smith et al. |
| 2010/0043067 | A1 | 2/2010 | Varadhan et al. |
| 2010/0057667 | A1 * | 3/2010 | Gotoh ..................... G06N 5/025 706/59 |
| 2010/0333165 | A1 | 12/2010 | Basak et al. |
| 2011/0197278 | A1 | 8/2011 | Chow et al. |
| 2011/0202847 | A1 | 8/2011 | Dimitrov |
| 2011/0277034 | A1 | 11/2011 | Hanson |
| 2012/0260331 | A1 | 10/2012 | Aaron |
| 2013/0019277 | A1 | 1/2013 | Chang et al. |
| 2013/0067044 | A1 | 3/2013 | Levy-Yurista et al. |
| 2013/0097662 | A1 | 4/2013 | Pearcy et al. |
| 2013/0276053 | A1 | 10/2013 | Hugard, IV et al. |
| 2013/0347068 | A1 | 12/2013 | Elleboe et al. |
| 2014/0109168 | A1 | 4/2014 | Ashley et al. |
| 2014/0122669 | A1 | 5/2014 | Ennis, Jr. et al. |
| 2014/0165204 | A1 | 6/2014 | Williams et al. |
| 2014/0165207 | A1 | 6/2014 | Engel et al. |
| 2014/0213371 | A1 | 7/2014 | Jain |
| 2014/0215630 | A1 | 7/2014 | Raz et al. |
| 2014/0317677 | A1 | 10/2014 | Vaidya et al. |
| 2014/0351415 | A1 | 11/2014 | Harrigan et al. |
| 2014/0359749 | A1 | 12/2014 | Rieke et al. |
| 2015/0149611 | A1 | 5/2015 | Lissack |
| 2015/0264012 | A1 | 9/2015 | Rieke et al. |
| 2016/0072815 | A1 | 3/2016 | Rieke et al. |
| 2016/0072831 | A1 | 3/2016 | Rieke |
| 2016/0205002 | A1 | 7/2016 | Rieke et al. |
| 2017/0048268 | A1 | 2/2017 | Rieke et al. |
| 2018/0248901 | A1 * | 8/2018 | Rieke ................. H04L 63/1425 |

OTHER PUBLICATIONS

H. Shiravi, A. Shiravi and A. A. Ghorbani, "A Survey of Visualization Systems for Network Security," in IEEE Transactions on Visualization and Computer Graphics, vol. 18, No. 8, pp. 1313-1329 (Aug. 23, 2011).

International Patent Application PCT/US2015/044865, International Search Report and Written Opinion, dated Dec. 21, 2015.

International Patent Application PCT/US2015/047964, International Search Report and Written Opinion, dated Dec. 11, 2015.

U.S. Appl. No. 15/336,691, filed Oct. 27, 2016, Inventor: Malcolm Rieke, et al, Status: Docketed New Case—Ready for Examination, Status Date: Jan. 30, 2017.

Title: Systems and Methods for Network Analysis and Reporting, U.S. Appl. No. 14/523,624, filed Oct. 24, 2014, Inventor: Malcolm Rieke, Status: Final Rejection Mailed, dated Jan. 24, 2017.

Title: Systems and Methods for Creating and Modifying Access Control Lists, U.S. Appl. No. 14/821,103, filed Aug. 7, 2015, Inventor: Malcolm Rieke, et al, Status: Non Final Action Mailed, dated Nov. 23, 2016.

Title: Systems and Methods for Network Data Flow Aggregation, U.S. Appl. No. 14/974,378, filed Dec. 18, 2015, Inventor: Malcolm Rieke, et al, Status: Docketed New Case—Ready Examination, Status Date: Feb. 9, 2016.

* cited by examiner

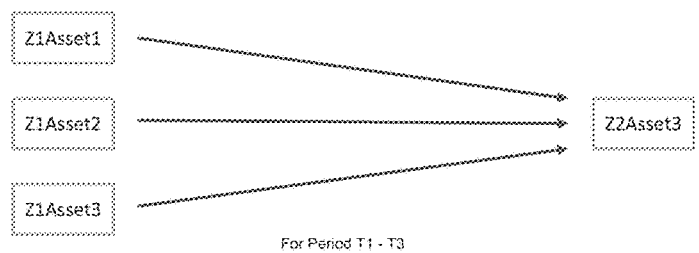
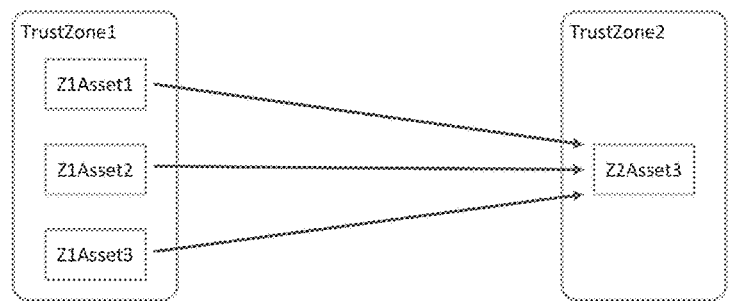
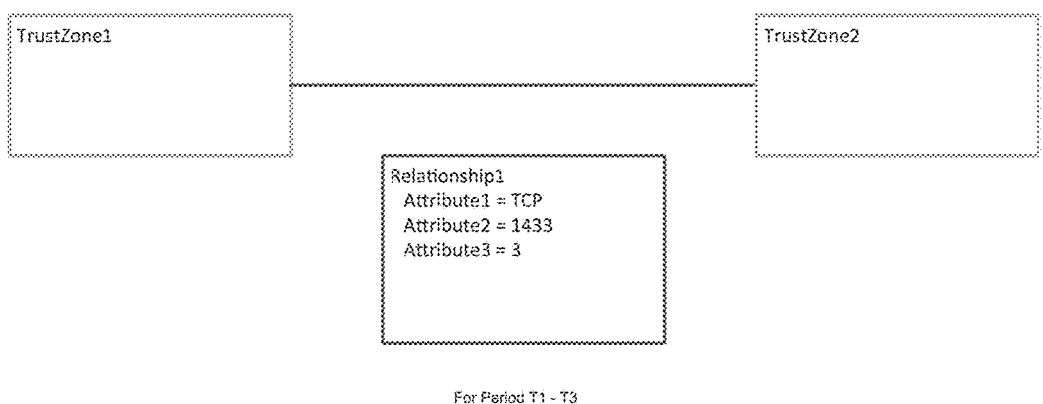
FIG. 5

Defining a Baseline from a set of assets and a set of relationships

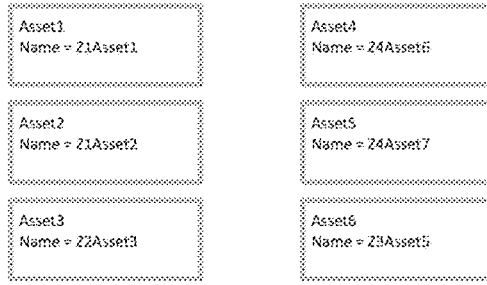

Set of Assets W

Select assets based on attribute value pairs
   Name = Z1Asset1 OR
   Name = Z4Asset6

Set of Events E

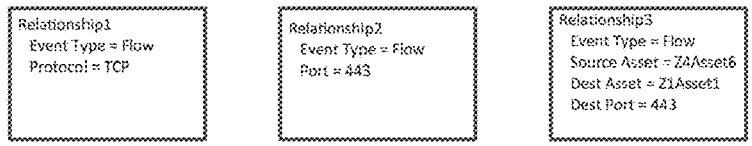

For any event type a set of relationships may be defined based on any attribute value or attribute value pair. This is an examplory set of relationships that could be defined to evaluate network flows. The table of flows is provided for context only as the number of attributes may vary widely for any event. These attributes are an augmented subset of the IPFix records from which they are derived.

Select relationships based on attribute values
   Z1Asset1 AND Z4Asset6

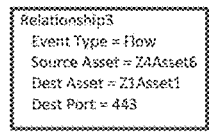

FIG. 7

Evaluating a baseline for drift

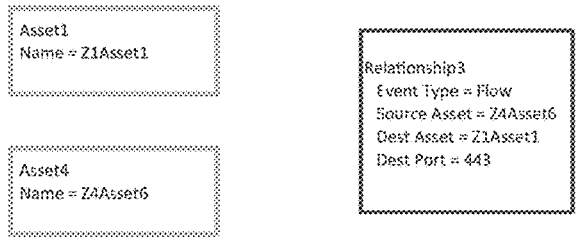

A baseline consisting of two assets and one relationship

| Time | Source Asset | Dest Asset | Dest Port |
|------|--------------|------------|-----------|
| T1   | Z4Asset6     | Z1Asset1   | 443       |
| T2   | Z4Asset6     | Z1Asset1   | 443       |
| T3   | Z4Asset6     | Z1Asset1   | 443       |
| T4   | Z4Asset7     | Z1Asset1   | 443       |

A sequence of events of type Flow are evaluated against Relationship3. The three events for time t where T1 <= t <= T3 all have attributes that match the attributes in Relationship3. At time t = T4 an event is evaluated where Source Asset = Z4Asset7. Since Z4Asset7 != Z4Asset6 the event is said to drift or fail the evaluation represented by Relationship3. Specifically the event at T4 fails the Source Asset = Z4Asset6 attribute value pair of Relationship3. This assumes real-time evaluation.

A visualization of the drift from baseline

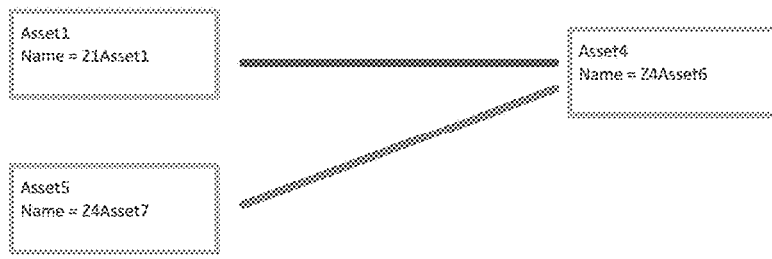

A alternate visualization of the drift from baseline where lines represent multiple flows

FIG. 8

Defining a Baseline from a set of assets and a set of relationships

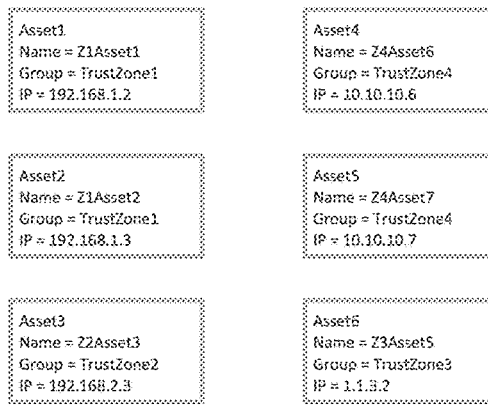

Set of Assets W (not all attributes shown)

Select multiple assets based on common attribute values
    Group = TrustZone1 OR
    Group = TrustZone4

Alternate Selections that have same asset results

IP = 192.168.1.0/24 OR
IP = 10.10.10.0/24

Name in set A where NAME in [Z1Asset1, Z1Asset2, Z4Asset6, Z4Asset7]

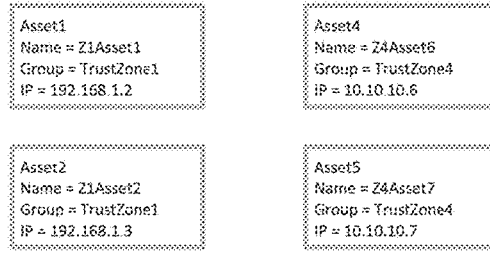

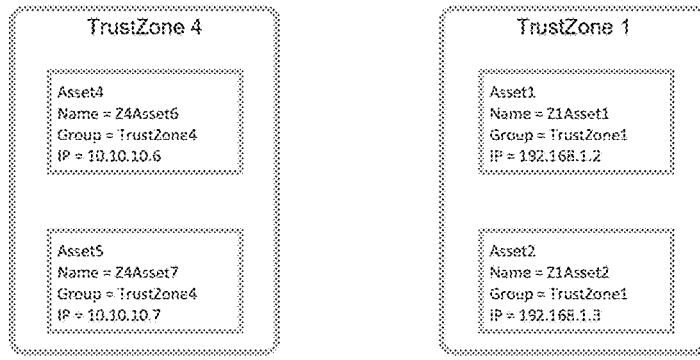

A visualization of the selected assets based on Group attribute

FIG. 9

Defining a Baseline from a set of assets and a set of relationships (continued)

| Time | Protocol | Source Asset | Src IP | Src TZ | Dest Asset | Dest IP | Dest Port | Dest TZ |
|------|----------|--------------|--------------|------------|------------|-------------|-----------|------------|
| T1 | TCP | Z4Asset6 | 10.10.10.6 | TrustZone4 | Z1Asset1 | 192.168.1.2 | 443 | TrustZone1 |
| T2 | TCP | Z4Asset6 | 10.10.10.6 | TrustZone4 | Z1Asset1 | 192.168.1.2 | 443 | TrustZone1 |
| T3 | TCP | Z4Asset6 | 10.10.10.6 | TrustZone4 | Z1Asset1 | 192.168.1.2 | 443 | TrustZone1 |
| T4 | TCP | Z4Asset7 | 10.10.10.7 | TrustZone4 | Z1Asset1 | 192.168.1.2 | 443 | TrustZone1 |
| T5 | TCP | Z4Asset6 | 10.10.10.6 | TrustZone4 | Z1Asset2 | 192.168.1.3 | 443 | TrustZone1 |
| T6 | TCP | Z4Asset7 | 10.10.10.7 | TrustZone4 | Z1Asset2 | 192.168.1.3 | 443 | TrustZone1 |
| T7 | TCP | Z4Asset7 | 10.10.10.7 | TrustZone4 | Z1Asset2 | 192.168.1.3 | 443 | TrustZone1 |

Set of Events E

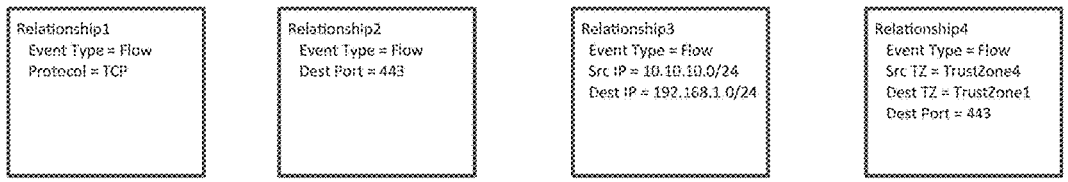

For event type a set of relationships may be defined based on any attribute value or attribute value pair. This is an exemplary of a set of relationships that could be defined to evaluate network flows. The table of flows is provided for context only as the number of attributes may vary widely for any event. These attributes are an augmented subset of attributes of the IPFix records from which they are derived.

Select relationships based on attribute value pairs
    Src TZ = TrustZone4 AND
    Dst TZ = TrustZone1

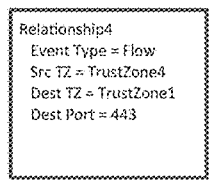

FIG. 10

Evaluating a baseline for drift

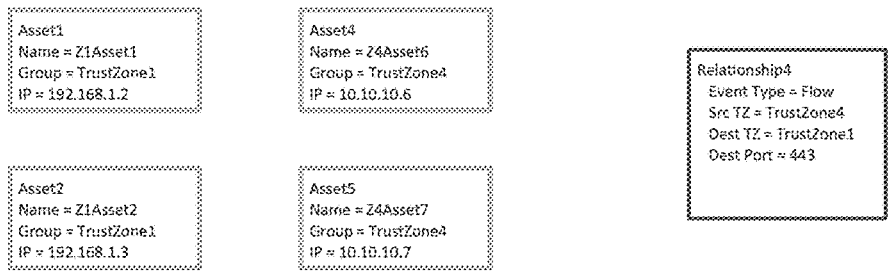

A baseline consisting of four assets and one relationship

| Time | Protocol | Source Asset | Src IP | Src Port | Src TZ | Dest Asset | Dest IP | Dest Port | Dest TZ |
|---|---|---|---|---|---|---|---|---|---|
| T1 | TCP | Z4Asset6 | 10.10.10.6 | 54321 | TrustZone4 | Z1Asset1 | 192.168.1.2 | 443 | TrustZone1 |
| T2 | TCP | Z4Asset6 | 10.10.10.6 | 34214 | TrustZone4 | Z1Asset1 | 192.168.1.2 | 443 | TrustZone1 |
| T3 | TCP | Z4Asset6 | 10.10.10.6 | 33021 | TrustZone4 | Z1Asset1 | 192.168.1.2 | 443 | TrustZone1 |
| T4 | TCP | Z4Asset7 | 10.10.10.7 | 5432 | TrustZone4 | Z1Asset1 | 192.168.1.2 | 443 | TrustZone1 |
| T5 | TCP | Z4Asset6 | 10.10.10.6 | 1901 | TrustZone4 | Z1Asset2 | 192.168.1.3 | 443 | TrustZone1 |
| T6 | TCP | Z4Asset7 | 10.10.10.7 | 43235 | TrustZone4 | Z1Asset2 | 192.168.1.3 | 443 | TrustZone1 |
| T7 | TCP | Z4Asset7 | 10.10.10.7 | 32044 | TrustZone4 | Z1Asset2 | 192.168.1.3 | 443 | TrustZone1 |
| T8 | TCP | Z1Asset1 | 192.168.1.2 | 1026 | TrusTzone1 | Z2Asset3 | 192.168.2.3 | 1433 | TrustZone2 |

A sequence of events of type Flow are evaluated against Relationship4. The seven events for time t where T1 <= t <= T7 all have attributes that match the attributes in Relationship4. At time t = T8 an event is evaluated where Src TZ = TrustZone1, Dest TZ = TrustZone2, and Dest Port = 1433. Since all of these attributes do not match those in Relationship4 the event is said to drift or fail the evaluation represent by Relationship4. Specifically this event fails Src TZ = TrustZone4, Dest TZ= TrustZone2, and Dest Port = 443 attribute vale pair in Relationship4. This event can be said to drift in 3 ways or dimensions of the relationship. Note this assume realtime evaluation.

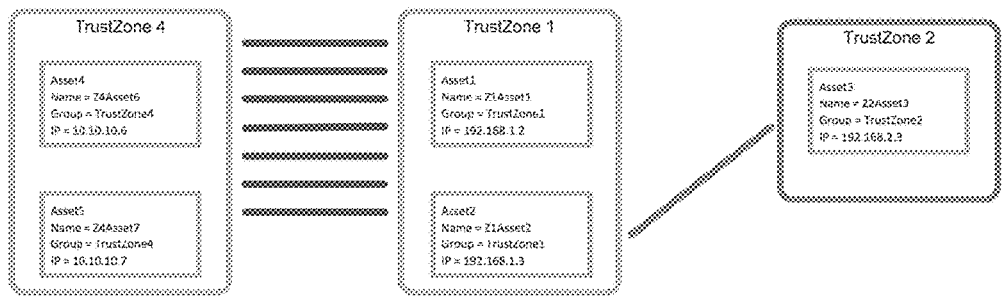

A visualization of the drift from baseline

FIG. 11

Defining a Baseline from a set of assets and a set of relationships
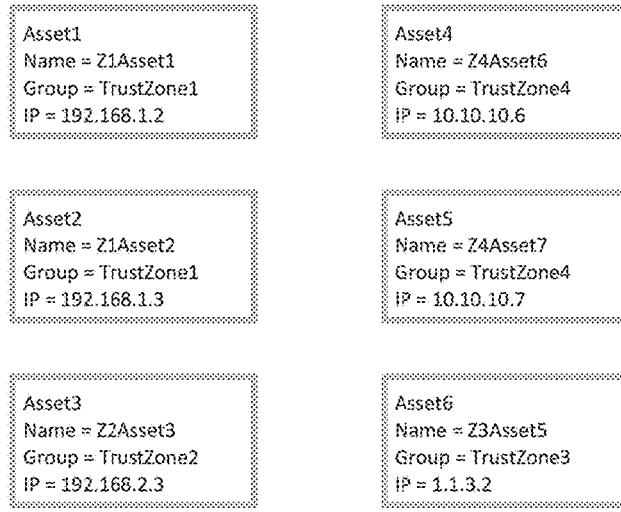
Set of Assets W (not all attributes shown)
Select multiple assets based on common
attribute values
    Group = TrustZone3 OR
    Group = TrustZone2 OR
    Group = TrustZone1
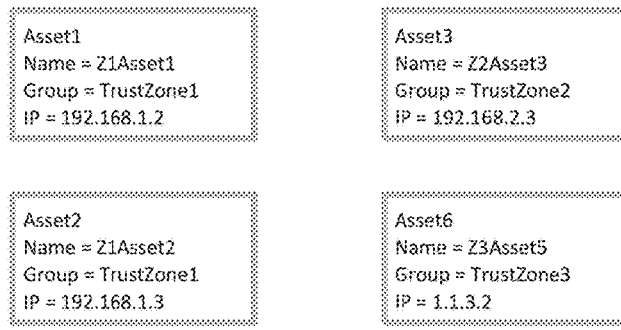
Selected Assets
FIG. 12

Evaluating a baseline for drift

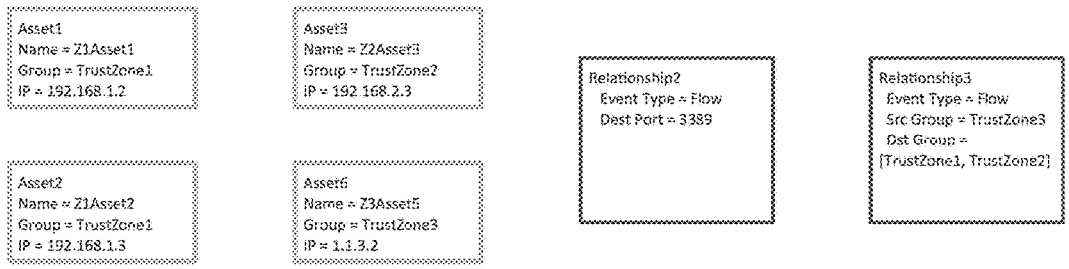

A baseline consisting of four assets and two relationships

| Time | Protocol | Source Asset | Src IP | Src Port | Src Group | Dest Asset | Dest IP | Dest Port | Dest Group |
|------|----------|--------------|--------|----------|-----------|------------|---------|-----------|------------|
| T12 | TCP | Z3Asset5 | 1.1.3.2 | 43213 | TrustZone3 | Z2Asset3 | 192.168.2.3 | 3389 | TrustZone2 |
| T13 | TCP | Z3Asset5 | 1.1.3.2 | 34545 | TrustZone3 | Z1Asset1 | 192.168.1.2 | 22 | TrustZone1 |
| T14 | TCP | Z3Asset5 | 1.1.3.2 | 9099 | TrustZone3 | Z1Asset2 | 192.168.1.3 | 22 | TrustZone1 |

A sequence of events of type Flow are evaluated against Relationship2 and Relationship3. The event for time t where t = T12 has attributes that match the attributes in both Relationship2 and Relationship3. The two events at time T13 and T14 have attributes that do not match Relationship2. The events are said to drift or fail the evaluations represented by Relationship2. Specifically these events fail Dest Port = 3389 attribute value pair in Relationship2.

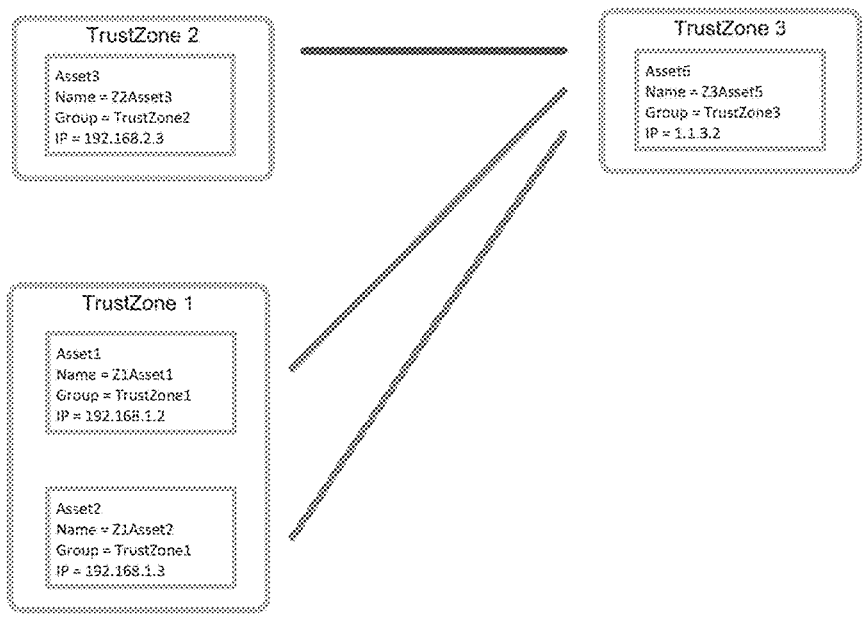

A visualization of the drift from baseline

FIG. 14

Defining a Baseline from a set of assets and a set of relationships

Asset1
Name = Z1Asset1
Group = TrustZone1
IP = 192.168.1.2

Asset4
Name = Z4Asset6
Group = TrustZone4
IP = 10.10.10.6

Asset2
Name = Z1Asset2
Group = TrustZone1
IP = 192.168.1.3

Asset5
Name = Z4Asset7
Group = TrustZone4
IP = 10.10.10.7

Asset3
Name = Z2Asset3
Group = TrustZone2
IP = 192.168.2.3

Asset6
Name = Z3Asset5
Group = TrustZone3
IP = 1.1.3.2

Set of Assets W (not all attributes shown)

Select multiple assets based on common attribute values
    Group = TrustZone1

Asset1
Name = Z1Asset1
Group = TrustZone1
IP = 192.168.1.2

Asset2
Name = Z1Asset2
Group = TrustZone1
IP = 192.168.1.3

Selected Assets

FIG. 15

Defining a Baseline from a set of assets and a set of relationships (continued)
| Time | EventID | AD Server | Asset | Group | User |
|------|---------|-----------|-----------|-----------|--------|
| T21 | 4768 | ADSrv1 | Z1Asset1 | TrustZone1 | alice |
| T13 | 4768 | ADSrv1 | Z1Asset2 | TrustZone1 | bob |
| T14 | 4768 | ADSrv1 | Z1Asset1 | TrustZone1 | charles |
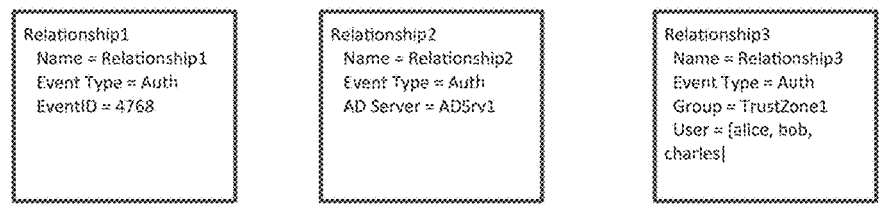
Select relationships based on common attribute values
    Name = Relationship3
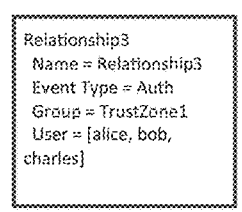
FIG. 16

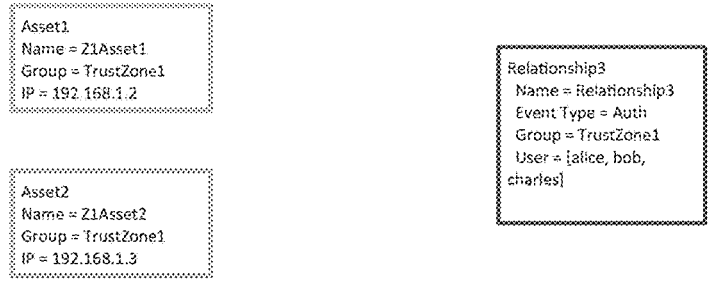

A baseline consisting of two assets and one relationship

Evaluating a baseline for drift

| Time | EventID | AD Server | Asset | Group | User |
|------|---------|-----------|----------|------------|---------|
| T12  | 4768    | ADSrv1    | Z1Asset1 | TrustZone1 | alice   |
| T13  | 4768    | ADSrv1    | Z1Asset2 | TrustZone1 | bob     |
| T14  | 4768    | ADSrv1    | Z1Asset1 | TrustZone1 | charles |
| T15  | 4768    | ADSrv1    | Z1Asset2 | TrustZone1 | dan     |

A sequence of events of type Auth are evaluated against Relationship3. Auth events with EventID=4768 in this case represent logon events. The events for time t where T12 <= t <= T14 have attributes that match the attributes in Relationship3 (Note: User is evaluated as a member of the set User in the relationship). The event at time T15 has an attribute that does not match Relationship3. The event is said to drift or fail the evaluation represented by Relationship3. Specifically this event fails User is a member of the set User in the relationship.

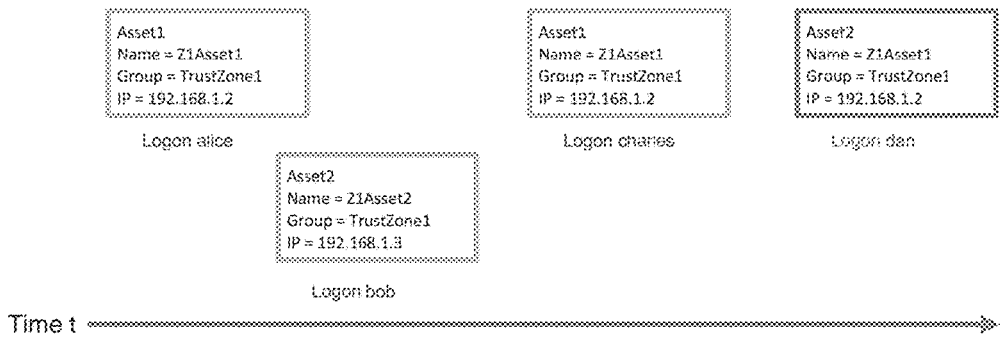

A visualization of the drift from baseline

FIG. 17

Defining a Baseline from a set of assets and a set of relationships
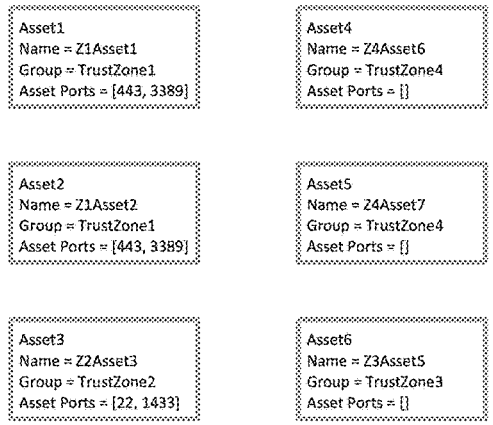
Set of Assets W (not all attributes shown)
Select multiple assets based on common attribute values
    Group = TrustZone1
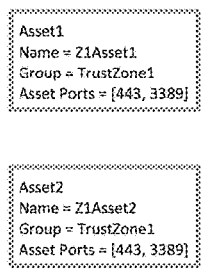
Selected Assets
FIG. 18

Defining a Baseline from a set of assets and a set of relationships (continued)

| Time | Type | Scanner | Scan Status | Asset | Group | Detected Ports |
|---|---|---|---|---|---|---|
| T24 | Port Scan | Appliance1 | Success | Z1Asset1 | TrustZone1 | 443, 3389 |
| T25 | Port Scan | Appliance2 | Success | Z1Asset2 | TrustZone1 | 443, 3389 |

Relationship1
Name = Relationship1
Event Type = Port Scan
Scan Freq = 30

Relationship2
Name = Relationship2
Event Type = Port Scan
Scan Status = Success

Relationship3
Name = Relationship3
Event Type = Port Scan
Group = TrustZone1
Detected Ports[] = Asset Ports[]

Select relationships based on attribute values
    Detected Ports

Relationship3
Name = Relationship3
Event Type = Port Scan
Group = TrustZone1
Detect Ports[] = Asset Ports[]

FIG. 19

Evaluating a baseline for drift

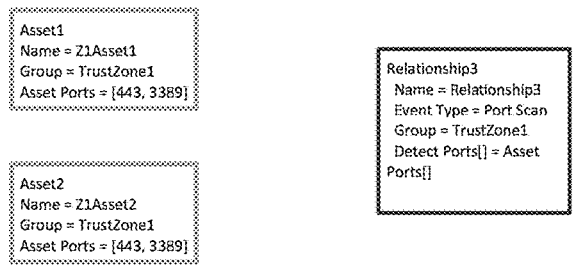

A baseline consisting two assets and one relationships

| Time | Type | Scanner | Scan Status | Asset | Group | Detected Ports |
|---|---|---|---|---|---|---|
| T24 | Port Scan | Appliance1 | Success | Z1Asset1 | TrustZone1 | 443, 3389 |
| T25 | Port Scan | Appliance 2 | Success | Z1Asset2 | TrustZone1 | 443, 3389 |
| T26 | Port Scan | Appliance 2 | Success | Z1Asset1 | TrustZone1 | 443, 3389, 37337 |

A sequence of events of type Port Scan are evaluated against Relationship3. The events for time t where T24 <= t <= T25 have attributes that match the attributes in Relationship3. The event at time T26 has an attribute that does not match Relationship3. The event is said to drift or fail the evaluation represented by Relationship3. Specifically this event fails Detected Ports[] = Asset Ports[].

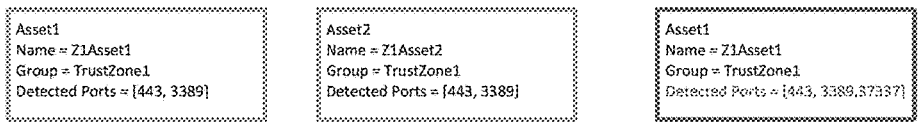

Time t ⟶

A visualization of the drift from baseline

FIG. 20

| Time | Protocol | Source Asset | Src IP | Src Port | Src TZ | Dest Asset | Dest IP | Dest Port | Dest TZ | Packet Cnt | Data Cnt |
|------|----------|--------------|--------|----------|--------|------------|---------|-----------|---------|------------|----------|

Event Data
Time
Protocol
Source Asset
Src IP
Source Port
Source TZ
Dest Asset
Dest IP
Dest Port
Dest TZ
Packt Cnt
Data Cnt

FIG. 22

Event Data
Time
Protocol
Source Asset
Src IP
Source Port
Source TZ
Dest Asset
Dest IP
Dest Port
Dest TZ
Packet Cnt
Data Cnt Example Flow Event Attributes, Classifications and Evaluations

| Attribute | Classification | Evaluations |
|---|---|---|
| Time | Interval | Is in range, start range, end range |
| Protocol | Nominal | Is in set, create set |
| Source Asset | Nominal | Is in set, create set |
| Src IP | Ordinal | Is in range, Is in set, create range, create set |
| Src Port | Ordinal | Is in range, is in set, create range, create set |
| Source TZ | Nominal | Is in set, create set |
| Dest Asset | Nominal | Is in set, create set |
| Dest IP | Ordinal | Is in range, is in set, create range, create set |
| Dest Port | Ordinal | Is in range, is in set, create range, create set |
| Dest TZ | Nominal | Is in set, create set |
| Packet Cnt | Ratio | Max/Min count, Running (mean, mode, average) |
| Data Bytes | Ratio | Max/Min count, Running (mean, mode, average), In/Out Ratio |

FIG. 23

BEHAVIORAL BASELINING OF NETWORK SYSTEMS

RELATED APPLICATIONS

This application is related to U.S. Pat. App. Pub. No. US 2015/0264012, published Sep. 17, 2015, and entitled "SYSTEMS AND METHODS FOR DYNAMIC NETWORK SECURITY CONTROL AND CONFIGURATION", the entire disclosure of which application is hereby incorporated by reference.

This application is also related to U.S. Pat. App. Pub. No. US 2016/0072831, published Mar. 10, 2016, entitled "SYSTEMS AND METHODS FOR NETWORK ANALYSIS AND REPORTING," the entire disclosure of which application is hereby incorporated by reference.

This application is also related to U.S. Pat. App. Pub. No. US 2016/0072815, published Mar. 10, 2016, entitled "SYSTEMS AND METHODS FOR CREATING AND MODIFYING ACCESS CONTROL LISTS," the entire disclosure of which application is hereby incorporated by reference.

FIELD OF THE TECHNOLOGY

At least some embodiments disclosed herein relate to network security control in general, and more particularly, but not limited to, behavioral baselining of network systems.

BACKGROUND

Information security architects and security operators, as well as computer and network administrators and operators, as well as governance, risk and compliance personnel all face various challenges with respect to monitoring and controlling networked-based computer systems within the corporate computing environment.

SUMMARY OF THE DESCRIPTION

Systems and methods for behavioral baselining of network systems are described herein. Some embodiments are summarized in this section.

In one embodiment, a method implemented by at least one computing device includes: storing, in an asset attribute database, information regarding assets, wherein each asset comprises at least one attribute; storing, in a relationship database, information regarding relationships, wherein each relationship comprises at least one attribute; selecting, from the asset attribute database, assets based on at least one attribute value; selecting, from the relationship database, one or more relationships based on at least one attribute value, the selected relationships including a first relationship; creating a baseline, wherein the baseline comprises the selected assets and the selected relationships; connecting a first event stream to the baseline, wherein the first event stream comprises a set of events, and each event comprises attributes; and detecting a drift from the baseline, wherein the drift is determined using the first event stream and is based on a failure of at least one attribute value in a first event of the first event stream to pass or fail an evaluation contained in the first relationship.

Among other things, various embodiments of the present disclosure can present information on services hosted and used by various assets on a network, and allow users to create baselines for various behaviors and create alerts for deviations from those baselines. In particular, various embodiments of the disclosure may be used to select one or more operational attributes of network data connections and provide actionable intelligence to the operator when deviations occur. This allows for the contextualization of deviations in network activity with the operation of various security technical controls and presents a more specific picture of those activities that may be hostile or erroneous in the network.

In one embodiment, a computer-implemented method includes collecting, by a computer system, data from a plurality of different types of sources on a network; identifying, by the computer system based on the collected data, one or more compute assets, one or more operational events, data attributes associated with those assets and events; presenting, by the computer system, a graphical representation that includes representations of: the compute assets, the operational events, attributes of the assets and operational events, wherein the graphical presentation is presented via a display of a user interface in communication with the computer system, receiving, by the computer system via the user interface, input from the user that includes: a selection of one or more compute assets, one or more operational events, one or more asset attributes, one or more operational event attributes, and one or more evaluation criteria, and in response to the input from the user, creating real time or batch analyses of a plurality of operational event streams, and as a result of those analyses presenting to the user via the user interface or any appropriate messaging mechanisms, deviations in those operational event streams that represent qualitative and quantitative variations in the behavior of the computing systems relative to the baseline. Furthermore, over time, these baselines and analyses can be automatically created through observation of the operational event streams.

The present disclosure includes methods and apparatuses which perform these methods, including data processing systems (e.g., a system comprising at least one processor and memory storing instructions to cause the at least one processor to perform these methods), and computer readable media containing instructions which when executed by at least one computing device cause the systems to perform these methods.

Other features will be apparent from the accompanying drawings and from the detailed description which follows.

BRIEF DESCRIPTION OF THE DRAWINGS

The embodiments are illustrated by way of example and not limitation in the figures of the accompanying drawings in which like references indicate similar elements.

FIG. 5 depicts multiple operational events, in this case normalized IPFix network flow events, and how assets and relationships may be constructed and visualized based on this simple set of events, according to one embodiment. The relationship depiction at the bottom of FIG. 5 also depicts how relationships may have data that is derived from a stream of data, in this case Attribute 3 shows the running flow event count of 3 (i.e., the event count is the number of events in the event stream T1, T2, T3 of FIG. 5).

FIG. 7 depicts the flow of operations for defining a baseline including selecting assets with logical operators, a simple event stream depicting the events to be evaluated, and the selection of a relationship from a set of existing relationships that pertain to the event stream using logical operators, according to one embodiment.

FIG. 8 depicts a baseline consisting of an asset set and a relationship, with an event set which contains a deviating event (one that deviates from the baseline), and how that event deviates based on the evaluations, according to one embodiment. Furthermore, two possible visualizations of the state of the baseline and the deviation may be depicted by the system (e.g., by presentation on a display of a user computing device).

FIG. 9 depicts an asset set and the asset selection process based on logical operations, as well as alternate types of asset selection expressions, according to one embodiment. Based on the asset universe depicted, two visualizations of the assets, an asset view and an equivalent logical group view based on TrustZone membership are also depicted.

FIG. 10 depicts an event stream, temporally-ordered, a set of existing relationships pertaining to the event stream, and the relationship selection process based on logical operations, according to one embodiment.

FIG. 11 depicts the baseline constructed in FIGS. 9-10 and an event stream containing a deviating event, according to one embodiment. The event in this case fails multiple evaluations in the relationship and can be said to deviate in multiple dimensions. A visualization of the state of the baseline with the deviation or drift is also depicted.

FIG. 12 depicts an asset set and the asset selection process based on logical operations, according to one embodiment.

FIG. 14 depicts the baseline constructed in FIGS. 12-13, an event stream showing two events that deviate from the baseline, and a visualization of the state of the baseline and the deviations or drift, according to one embodiment.

FIG. 15 depicts an asset set and the asset selection process based on logical operations, according to one embodiment.

FIG. 16 depicts an event stream, in this case authentication events, a set of relationships relevant to the event stream, and the relationship selection process based on logical operations, according to one embodiment.

FIG. 17 depicts the baseline constructed in FIGS. 15-16, an event stream showing a single event that deviates from the baseline, and a visualization of the state of the baseline and the deviation or drift, according to one embodiment. This shows how an event relative to a single asset may be evaluated by the system.

FIG. 18 depicts an asset set and the asset selection process based on logical operations, according to one embodiment. This asset set contains assets that have an attribute that consists of a list of data elements called "Asset Ports".

FIG. 19 depicts an event stream, in this case "Scan Events", a set of relationships relevant to the event stream, and the relationship selection process based on the relationship having an attribute named "Detected Ports", according to one embodiment. Furthermore, this illustrates how relationships may evaluate event attributes relative to asset attributes in that the relationship checks if the list of "Detected Ports" is equal to the list of "Asset Ports".

FIG. 20 depicts the baseline constructed in FIGS. 18-19, an event stream showing a single event that deviates from the baseline, and a visualization of the state of the baseline and the deviation or drift, according to one embodiment.

FIG. 22 depicts an exemplary event header and a depictions of how that data may be represented in an event that may be used in conjunction with various embodiments of the present disclosure.

FIG. 23 depicts an exemplary event, exemplary data attribute taxonomy, and an exemplary set of evaluation methods for the event data attributes that may be used in conjunction with various embodiments of the present disclosure.

DETAILED DESCRIPTION

Figure 1:
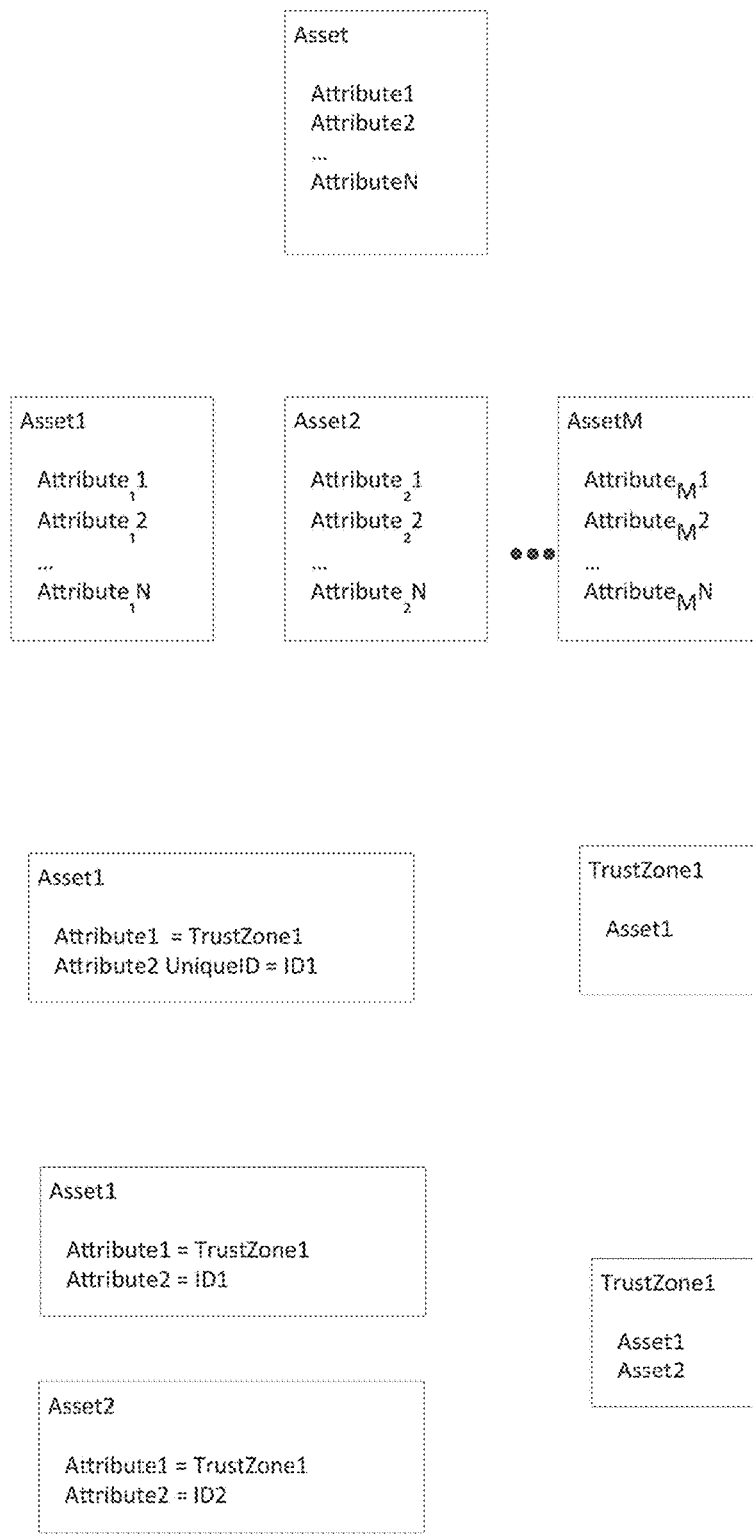
FIG. 1 depicts exemplary assets utilized by a computing system and how asset attributes relate to membership in logical zones or TrustZones, and how in various embodiments of the present disclosure these may be functionally equivalent for visualization and analysis purposes within the operation of the system, according to one embodiment.
Figure 2:
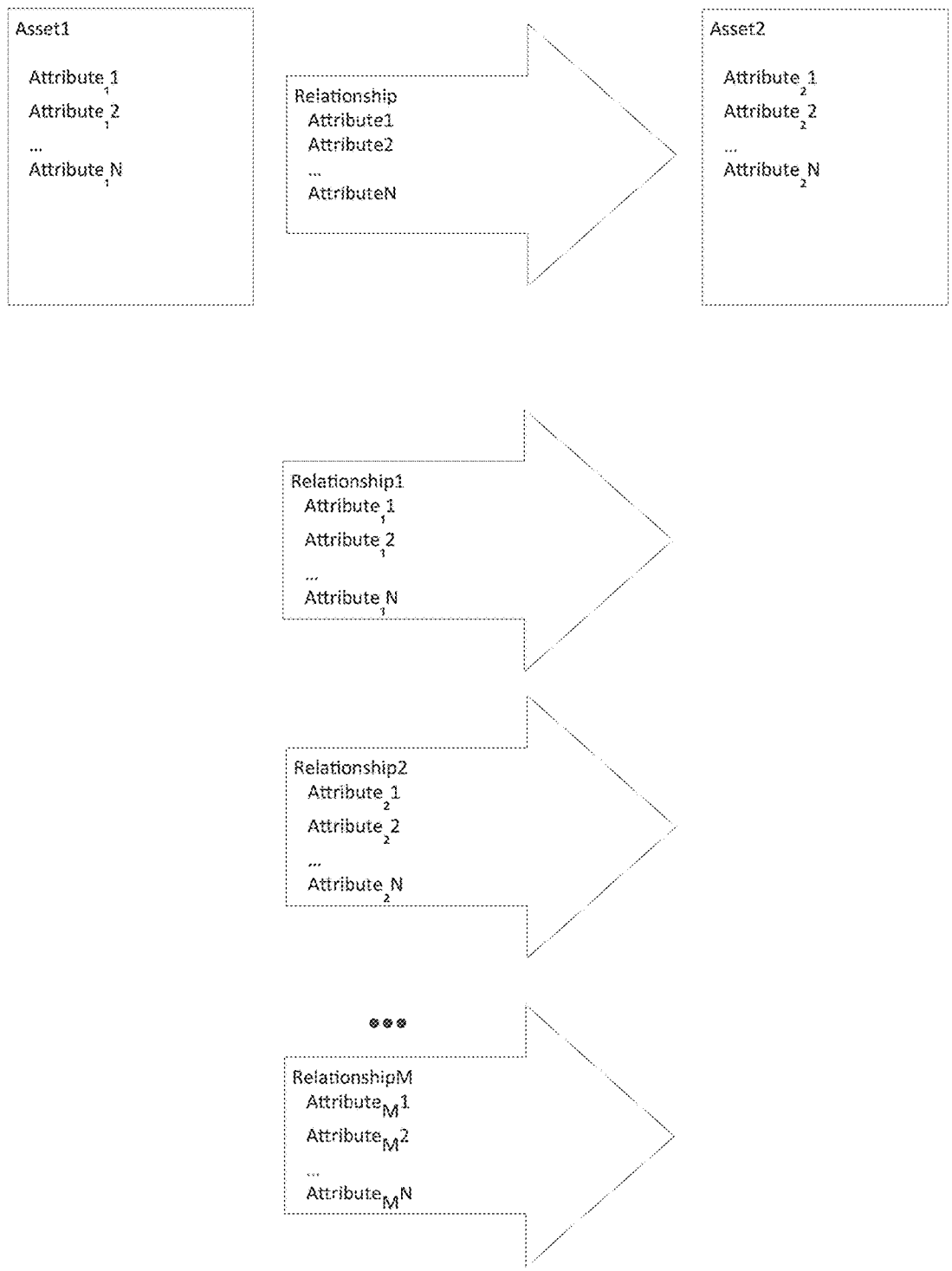
FIG. 2 depicts exemplary relationships utilized by the system and how relationships may relate to one, multiple, or no assets, and how both assets and relationships have attributes, according to one embodiment. Furthermore, the system may maintain an arbitrary number of relationships.
Figure 3:
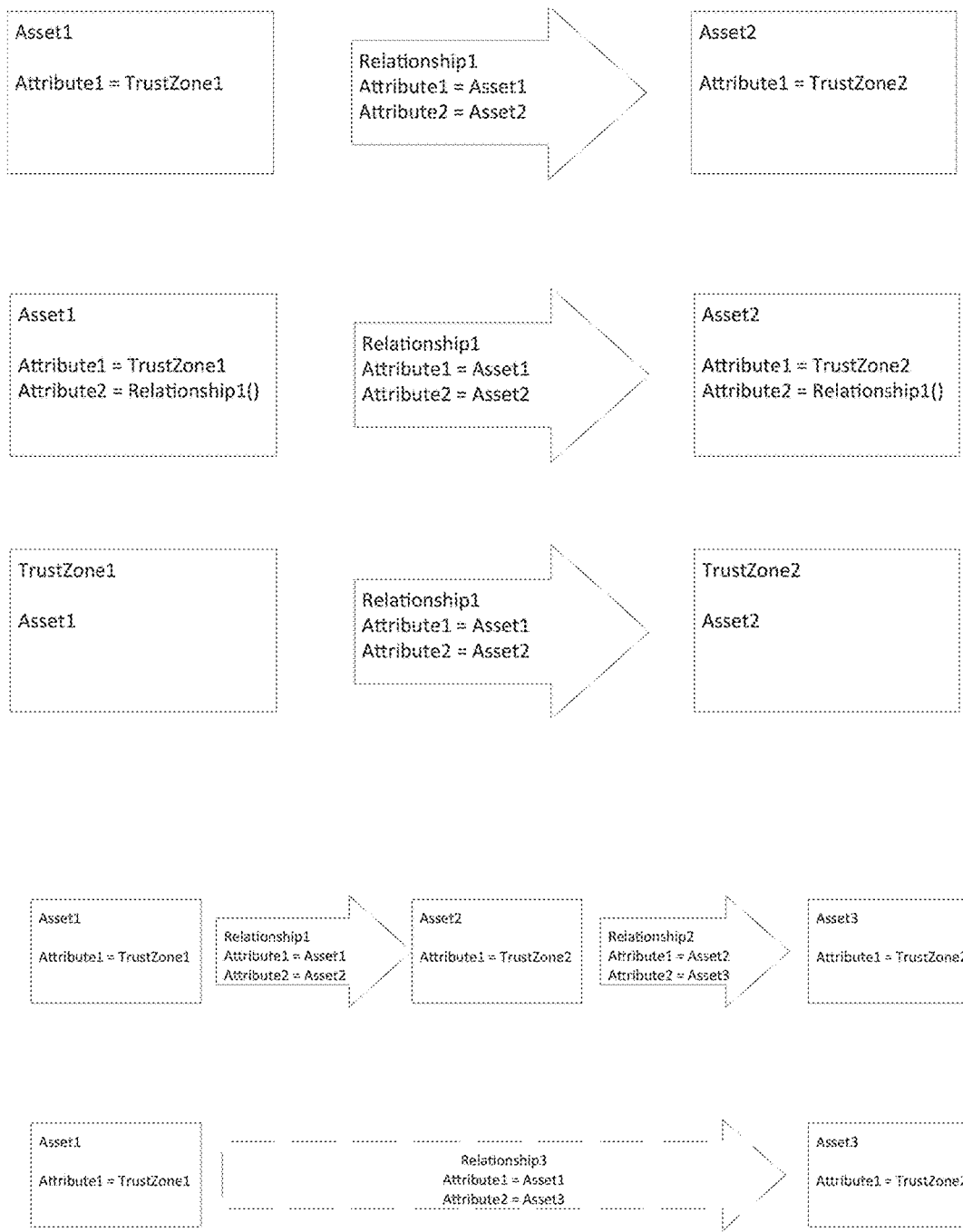
FIG. 3 depicts how relationships relate to assets based on attributes or attribute value pairs collected or retrieved by the system in real time or via querying stored data and how relationships are transitive based on TrustZone membership attributes in that they can relate either assets or logical groups of assets and furthermore how relationships may be transitive in nature in that the evaluation of one relationship relating Asset1 to Asset2 in conjunction with a second relationship relating Asset2 to Asset3, may result through the operation of the present disclosure in evaluation of a third relationship which relates Asset1 to Asset3, according to one embodiment.
Figure 4:
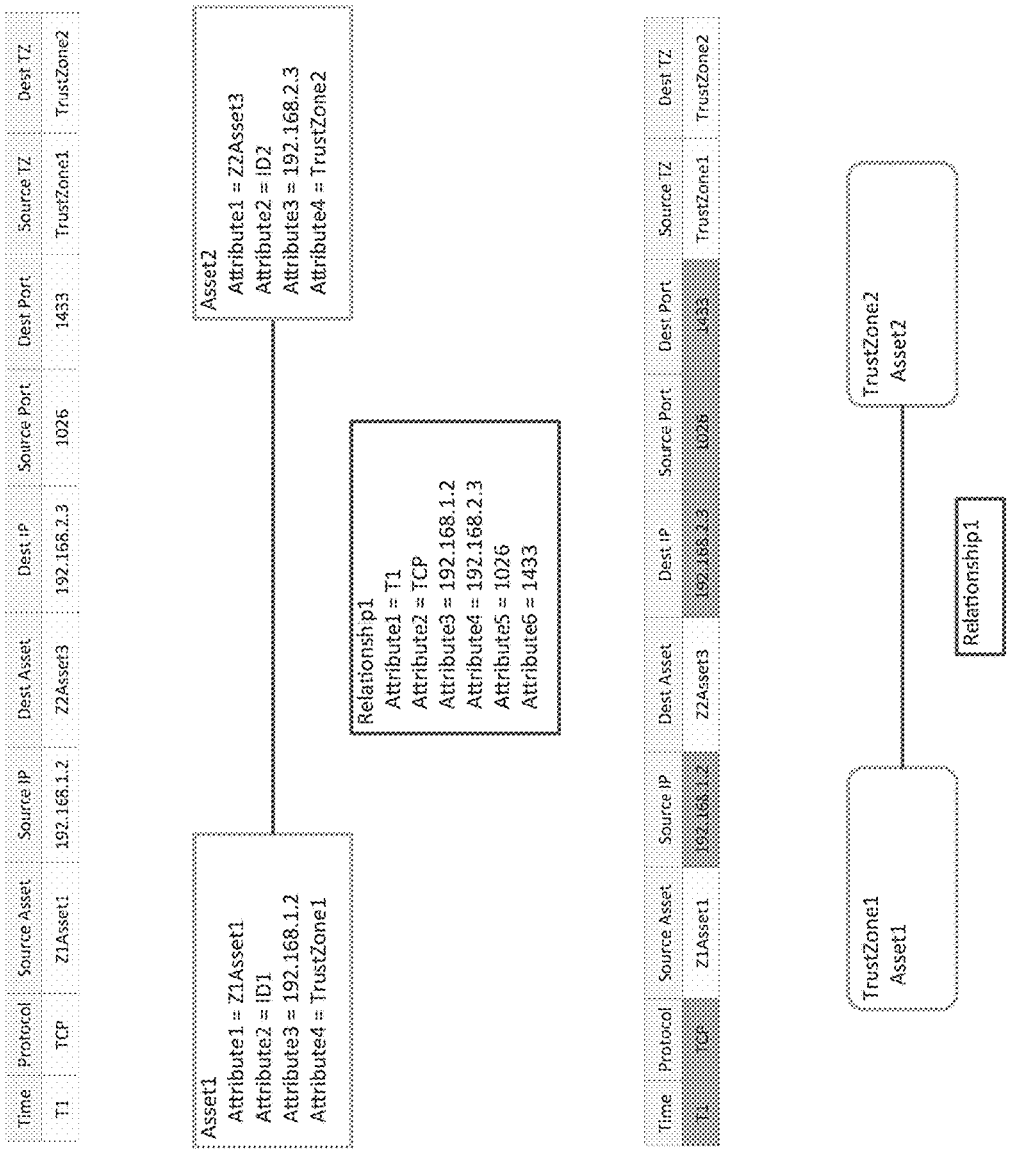
FIG. 4 depicts how relationships are evaluated or verified as existing based on event attributes, particularly in this figure of normalized IPFix network flow events and how arbitrary event attributes may be used for the evaluation of relationships, and furthermore how different visualizations, either asset or logical group based, of the assets and relationships may be depicted by the present disclosure, according to one embodiment.

Conventional systems for network monitoring and control typically have limited or no ability to produce information indicating normal operations or deviations from normal. Such challenges can be particularly difficult in distributed computing, virtualized computing systems, or "cloud computing" systems, where the components and environment of such systems may change frequently and rapidly.

Additionally, conventional systems for network monitoring and control typically only use data from a single source, or only one type of data (such as network flow data), thereby excluding potential sources of important context-supporting data and providing a one-dimensional, network-protocol-centric view of information flow between networked systems.

Furthermore, conventional systems often do not provide users (such as network administrators, operators, and security architects) with comprehensive and actionable information upon which to base decisions such as whether to permit or deny a particular asset access to services hosted by another asset on the network. Various embodiments of the present disclosure help to address such challenges as described further below.

Systems, methods and computer program products are provided herein. In the detailed description herein, references to "various embodiments", "one embodiment", "an embodiment", "an exemplary embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. After reading the description, it will be apparent to one skilled in the relevant art(s) how to implement the disclosure in alternative embodiments.

In various embodiments, the methods described herein are implemented using the various particular machines described herein. The methods described herein may be implemented using the below particular machines, and those hereinafter developed, in any suitable combination, as would be appreciated immediately by one skilled in the art. Further, as is unambiguous from this disclosure, the methods described herein may result in various transformations of certain articles.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements including, for example, event streams such as IPFIX data feeds, data channels, direct network inspection (such as in an intrusion detection system), log feeds, log inspection, and/or programmatic interactions such as those utilizing an application programming interface (API). It should be noted that many alternative or additional functional relationships or physical connections may be present in a practical system.

The present disclosure may reference the following terms defined in the list below. The definitions in this list are exemplary only. Changes, modifications, and variations based on different definitions of the terms, as well as different terms, are intended to be included within the scope of the present disclosure.

Asset—a discrete hardware based on a virtualized computing system that processes data in a data center, a virtualized computer or a virtual machine. Assets may become a member of a TrustZone either through automated methods as expressed in membership polices or manually through a user action.

Asset Attribute—a named property of an asset including but not limited to any operating system configuration setting, data processing application deployed on the asset, application configuration setting, hardware based or virtualized system component including network interface, memory, disk, networking component interconnection, unique identifier, name, or any discrete data component or label associated with an asset, an asset configuration, or the asset's position within the physical or virtualized datacenter system. As one example, an asset's TrustZone membership is an attribute of the asset.

Attribute Value Pair—an instance of the attribute identifier or name with a value. The value may be any data type suitable for the storage of the data that the attribute represents.

Event Stream—a sequence of data structures either raw or normalized that originate from any element in the computing, network or security system. An event stream contains a sequence of data related to the operation of computer, network, or security elements in the computing environment representing the state of some component generally but not necessarily at a specific time.

Baseline—a combination of one or more assets and one or more relationships evaluated against one or more sets of events either temporally or instantaneously.

Drift—a condition of a computing or networking system, expressed in terms of the aggregate event universe, where an event or series of events passes or fails an evaluation as expressed by a relationship as described herein.

Security Technical Control—a device, technology, software program, or a configuration or attribute of an element that performs a security function or changes the security posture or state of an element including but not limited to: firewalling, intrusion detection and prevention, vulnerability scanning, vulnerability management and mitigation, anti-malware, host based intrusion detection and prevention, file integrity monitoring, authentication-authorization-auditing, encryption in motion, encryption at rest, encryption key and token management, user entitlement management, network access control, password length specification, configuration settings that dictate the operation of a system or element in one or another context of various security levels.

Policy—a policy is a rule, set of rules, and or set of data used to guide the operation or behavior of a system or system component/element. Specifically, a body of data associated with a security technical control that dictates the behavior and function of that control.

Logical Zone—an arbitrary grouping of assets that may or may not have common attributes associated with a set of policies. A logical zone is also referred to as a group or logical group herein.

Hypervisor—a piece of computer software, firmware or hardware that creates and runs virtual machines.

Virtual Switch—a piece of software that provides for the network interconnection of virtual machines on a hypervisor.

Firewall—a software or hardware based security technical control that controls network traffic passing through it by analyzing the traffic components (packets) and making a decision to pass or block the traffic based on a set of rules.

Intrusion Prevention System (IPS)—a software or hardware based security technical control that inspects network connections for the purpose of detecting and disrupting undesirable network traffic based on signatures or behavior modeling.

Vulnerability Scanner—a software or hardware based security technical control that assesses the vulnerability state of assets on the network through the process of connecting to the asset over the network or running the asset as a process and assessing the asset based on known vulnerability signatures, vulnerability indicators, observed behaviors of the asset, programs running on the asset, and/or operational attributes of the asset.

Compliance Framework—a structured set of guidelines, processes and procedures published for the purpose of defining accordance with established regulations, specifications, or legislation.

Group—See "Logical Zone" above. A "Catbird" TrustZone is a non-limiting example of a group or logical group and a set of policies.

TrustZone—a logical zoning construct consisting of a collection of policies that include control configuration policies, membership policies, and a collection of methods that implement dynamic control reconfiguration in response to changes in the computing environment. A TrustZone is a non-limiting example of a group.

GRC—Governance Risk and Compliance, a generalized grouping of three related functions within an organization that respectively deal with corporate governance, enterprise risk management (ERM) and corporate compliance with applicable laws and regulation.

Relationship—a set of attributes derived from asset attributes and or event attributes that are evaluated by the system by various methods including but not limited to: set theory, mathematical transformations, probabilistic graphical models, and any appropriate evaluation for the data types, in accordance with known and appropriately contrived data typologies (e.g., Chrisman's Typology), which the attributes contain, either temporally or instantaneously by evaluations also contained in the relationship.

Figure 25:
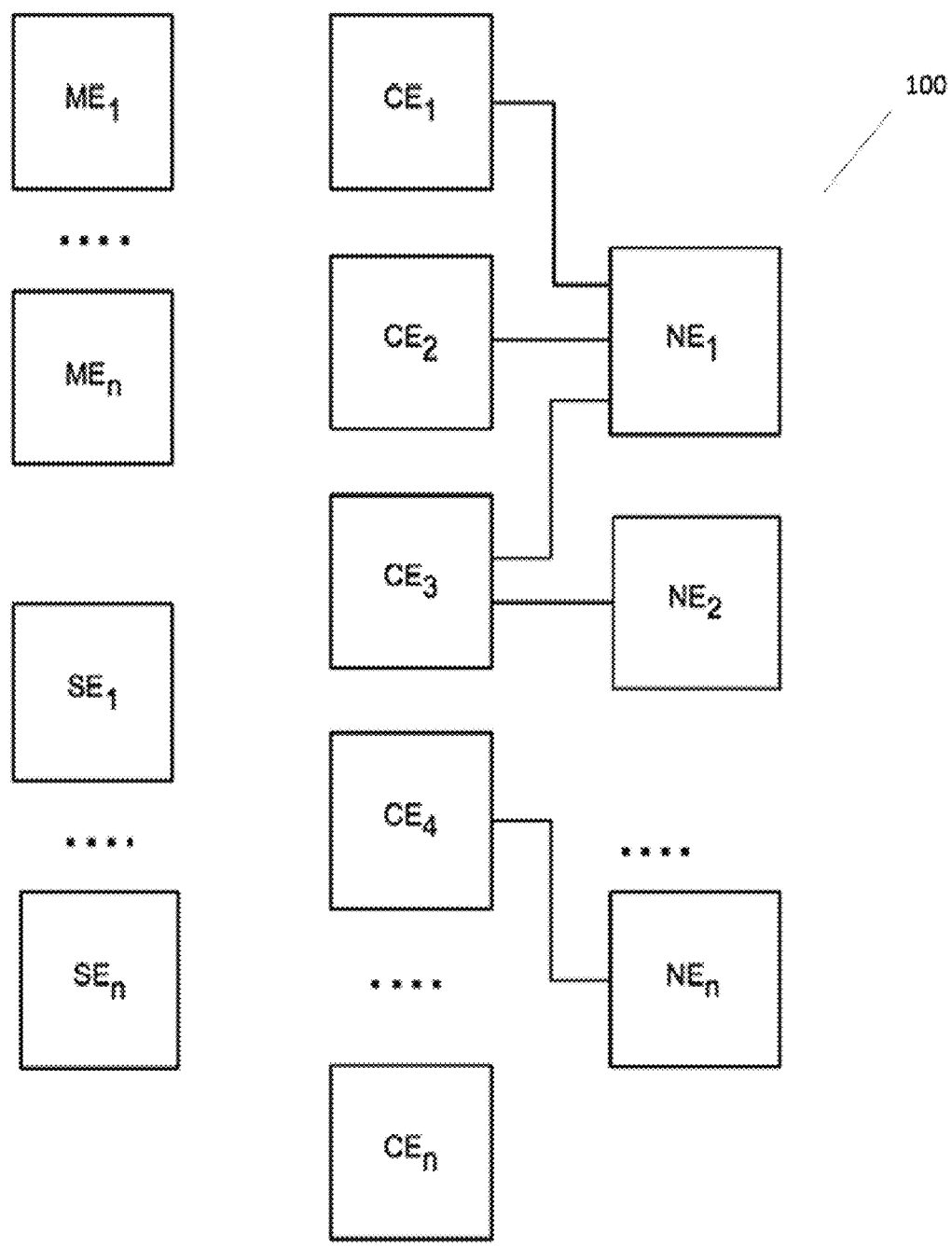
FIG. 25 depicts an exemplary computing environment that may be used in conjunction with various embodiments of the present disclosure.

Referring now to FIG. 25, an exemplary computing environment 100 that may operate in conjunction with embodiments of the present disclosure is depicted. The components of environment 100 may be implemented using any desired combination of hardware and software components, and may be hosted by, for example, host computing system 810 depicted in FIG. 27 (which is discussed in more detail below). Alternatively, or additionally, system 800 of FIG. 27 (or any portion thereof) may be included in environment 100.

In the example shown in FIG. 25, the environment 100 includes four different types of components: computing elements (CE), networking elements (NE), management elements (ME), and security elements (SE). Embodiments of the present disclosure may interact with any number of such components, as well as other components. Each individual component may represent computers or virtual machines including any desired physical or virtualized hardware computing resources, such as processors, memories, switches, routers, load balancers, operating systems, software applications, and/or configuration elements (files, processes, policies, programs). Any element or derivative thereof depicted in FIG. 25 may be implemented using any desired combination of physical and virtual components. Virtualized elements may be bound to physical hardware using any desired hypervisor software, such as VMware ESXi, Microsoft Hyper-V, and/or Kernel Virtual Machine (KVM).

Computing elements are characterized by their function as application platforms dedicated to the processing of data and to providing computer services in the form of applications to a user population of various privilege levels. One example of a computing element may include a physical or virtualized Microsoft Windows server or Linux server running an application.

Network elements are characterized by their function of providing for the interconnectivity (in part or in whole) of various elements within the computing environment with networking technology and protocols and to providing for the transportation of data between computing environment elements. Examples of network elements may include routers, switches, virtualized switches, networks, VLANs, and/or software defined networking components including virtual extensible LANs (VXLANS).

Management elements are characterized by their function as hosting applications that are dedicated to the management and operation of the computing environment, the processing of data, and providing management and operational services in the form of management and operation applications to a user population of privileged administrative users. Management elements may manage other elements including computing elements, network elements or other management elements. One example of a management element may include a Microsoft Windows server running VMware vSphere Server software that is managing hypervisors in the computing environment.

Security elements are characterized by their function of providing implementations of various technical security controls either at the network, host, virtual machine, asset, program, or process level. Security elements may have hierarchical deployment architectures that include any desired number of network elements, management elements, computing elements, programs, processes, and methods implemented in a physical and/or virtualized format. Examples of security elements may include a firewall appliance and its management element or software, anti-virus software and its management and update mechanisms, a vulnerability scanner, and/or a centralized public key infrastructure utilized for access or user entitlements.

Figure 26:
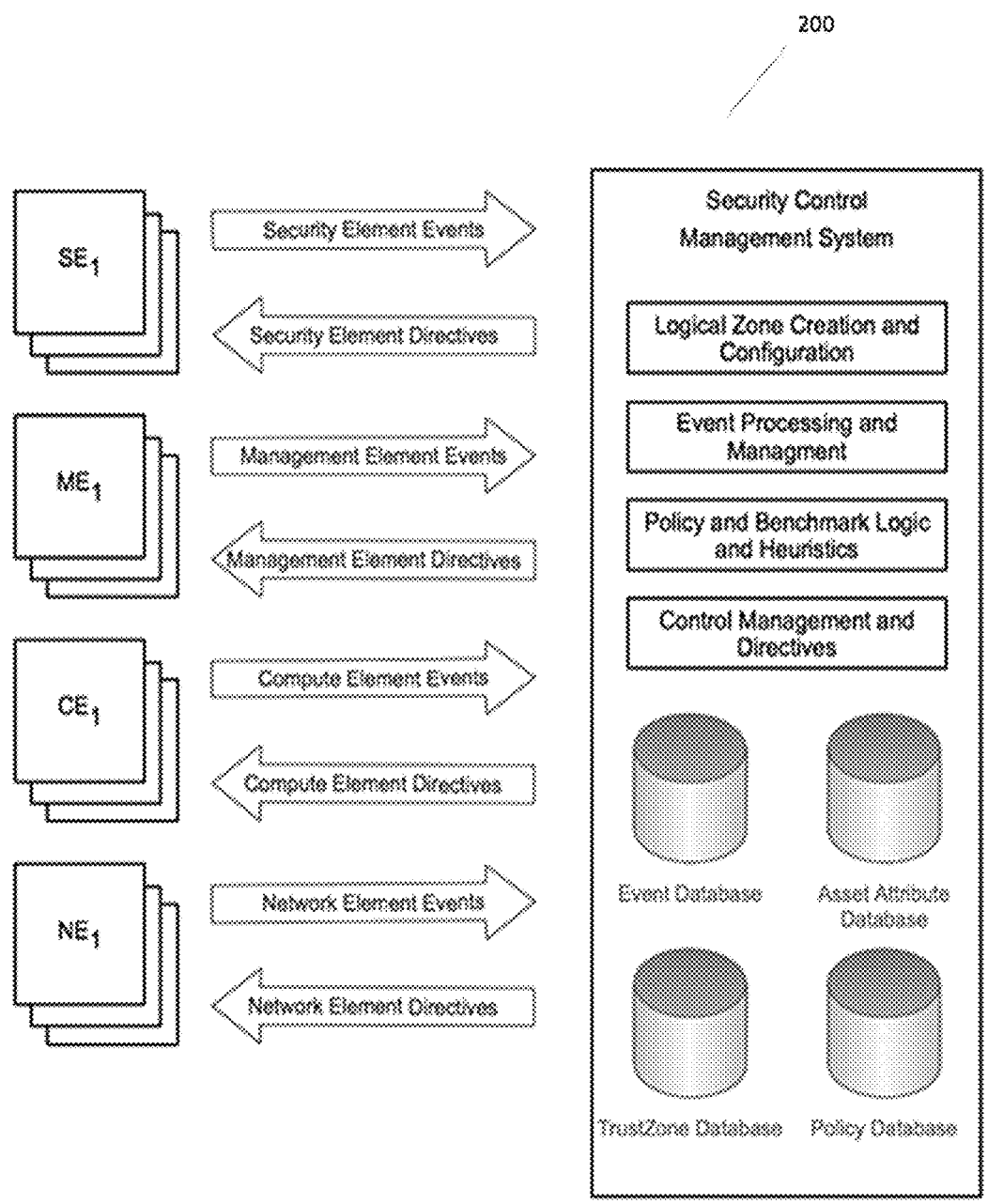
FIG. 26 depicts exemplary security control and management components according to various embodiments of the present disclosure.

FIG. 26 depicts components and programmatic inputs and outputs of a Security Control Management System (SCMS) 200 in accordance with an embodiment of the present disclosure. This embodiment may include various hardware and software components, software algorithms, data structures, and databases to implement various functions of the SCMS 200. Alternate SCMS's may have more, fewer, or different components and functionality.

In the exemplary embodiment depicted in FIG. 26, the SCMS 200 interacts with the computing environment through programmatic messaging mechanisms implemented via one or more standardized and/or proprietary interfaces or Application Programming Interfaces (APIs). The interface may utilize Secure Socket Layer (SSL) encryption, as well as any other desired encryption techniques to assure privacy and integrity of messages, events, directives and commands. Encryption techniques utilized by embodiments of the present disclosure may include mutual authentication for the sending and receiving elements. Programmatic messaging mechanisms may be implemented in any suitable manner by exemplary embodiments of the present disclosure such as via APIs, command line interface integrations, database queries, programmatic collection of display data (i.e., screen scraping), inter process communication methods, file system access, and others.

Through the programmatic messaging mechanisms, the SCMS 200 discovers information about the computing environment. Such information may include information related to individual elements, combinations of elements, or all elements. The discovered information may be used by the SCMS 200 for any desired purpose, such as to identify elements to be secured by the system and/or to heuristically determine element attributes for configuring security technical controls. The discovered information may also be used for evaluating compliance with governmental or industry regulations, security posture, security control function, security control efficacy, security control coverage, and/or security control operation.

The programmatic messaging mechanisms may include (where supported by the element or elements) the exchange between the element or elements and the SCMS 200, element related messages, logs, telemetry, configuration settings, data generated by programs or processes including or not including the SCMS 200, element attributes, data reflecting the current state and configuration of the element, and any other data relevant to the security technical controls, policies or benchmarks, either relative to the element itself or as available from the element or other elements in the computing environment, all of which are examples of events.

The programmatic messaging mechanisms may also include a command and/or configuration interface for reconfiguring the element in terms of configuration settings, policies, configuration files, the starting and stopping of element components including programs and processes, and/or to issue commands directly to the element for the purpose of changing the operational state of the element or to initiate reconfigurations performed through the same mechanism, all of which are examples of directives.

In the exemplary embodiment depicted in FIG. 26, the various components may include any desired combination of hardware and/or software components to perform various functions. For example, the Event Processing and Management component may normalize or transform such events for archiving and further processing by other components. Normalizations and transformations may include asset attribute substitution or addition through the addition of asset relevant identifiers for the purpose of associating the events with an information asset, the removal of data from the event for space reduction for archival purposes, the addition of attributes determined by the system to be relative to the originating element through events or algorithmic output from the system generated from events originating from other elements. Event processing may include extracting, from the event, streams of data and information relevant for the creation, maintenance and execution of policies, asset identification, configuration of security technical controls, and data relevant to the element and the state of the element relative to benchmarks or baselines consistent with and impacting the level of compliance with said benchmarks or baselines.

The Logical Zone Creation and Configuration performs the tasks related to TrustZone creation and configuration. This component deals with the mapping of information assets to logical zones (TrustZones) and provides the association of security technical control policies to the information asset.

The Policy and Benchmark Logic and Heuristics component performs the analysis of the policies and configurations of the security technical controls, relevant to and within the context of logical zones and the information assets within them within the context of the element events streams. This component measures data contained in events for the purpose of validating controls that are still in place and maps those control validations to various compliance frameworks such as PCI DSS 2.0, HIPAA, COBIT 4.1, DIACAP, and/or FISMA, as well as arbitrary frameworks, such as those devised at the discretion of an operator through the specification of various combinations of: policies, technical controls, asset attributes, required interactions with the SCMS verified by events, and/or attributes of elements of various types, such as those depicted in FIG. 25. This logic evaluates changes in security technical control configuration and asset attributes and performs security technical control policy reconfigurations based on those asset attribute changes for the purpose of maintaining the policy and application of the security technical controls and compliance with the benchmark. This logic evaluates various policy settings and takes the appropriate actions in response to asset attribute changes and asset TrustZone membership changes.

The Control Management and Directives component performs the construction of directives and initiates the delivery of directives to the computing environment elements to affect the appropriate action or actions from the elements including: the generation of events, transfer of configuration and process data in either direction, the starting and stopping of a security technical control, the reconfiguration of the security technical control with an updated policy, the reconfiguration of an element of any type, the starting and stopping of a program or process, the change of a configuration or attribute affecting a configuration, and the validation that the control is applied to any information asset as qualified by configuration data supplied through the events or directives.

The Event Database is a database used for the storage, retrieval, and management of events from any and all elements including the security control software itself. This database is used to store and subsequently query events for asset attribute data, security control configuration data, policy data and event data for the purposes of the various logic blocks and heuristics implemented in other components.

The Asset/Attribute Database is used for the storage, retrieval, and management of assets and asset attribute data. This database is used to store and subsequently query asset and asset attribute data for the purposes of the various logic blocks and heuristics implemented in other components.

The TrustZone Database is a database component used for the storage, retrieval, and management of logical zones (TrustZones). This component is used to store and subsequently query, update, modify TrustZones, information assets within a TrustZone, security technical control policies associated with the TrustZone for the purposes of the various logic blocks and heuristics implemented in other components.

The Policy Database is a database component used for the storage, retrieval, querying, and management of policies for the security technical controls, assets, software implementing embodiments of the present disclosure (or portions thereof), and the environment.

Figure 21:
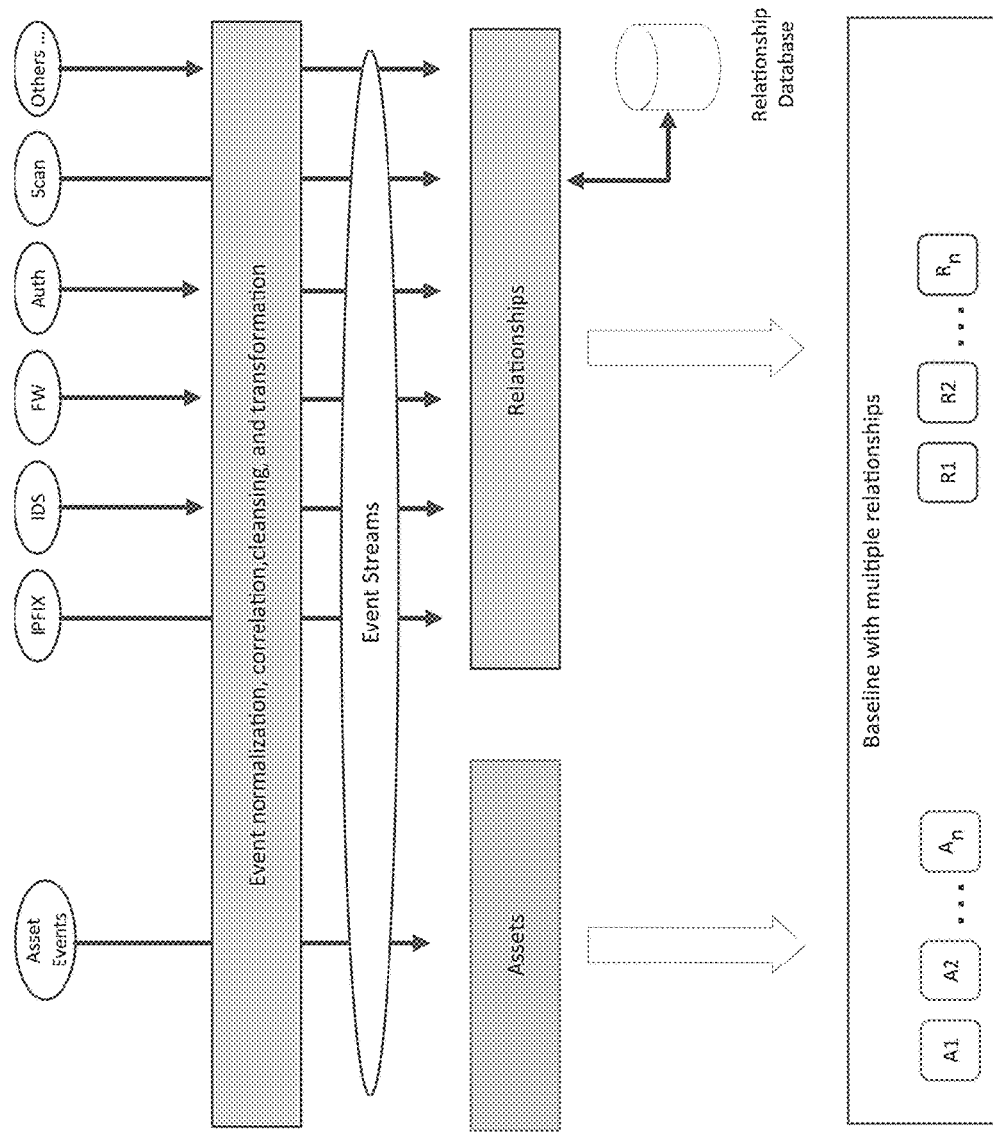
FIG. 21 depicts an exemplary event, normalization, asset, relationship, and baseline architecture that may be used in conjunction with various embodiments of the present disclosure.

FIG. 21 depicts additional elements of the SCMS to support functions and features in accordance with an embodiment of the present disclosure. This embodiment may include various hardware and software components, software algorithms, data structures, and databases to implement various functions of the SCMS 200. Alternate SCMS's may have more, fewer, or different components and functionality.

In the exemplary embodiment of the additional components depicted in FIG. 21, the SCMS interacts with the computing environment through programmatic messaging mechanisms implemented via one or more standardized and/or proprietary interfaces or Application Programming Interfaces (APIs). The interface may utilize Secure Socket Layer (SSL) encryption, as well as any other desired encryption techniques to assure privacy and integrity of messages, events, directives and commands. Encryption techniques utilized by embodiments of the present disclosure may include mutual authentication for the sending and receiving elements. Programmatic messaging mechanisms may be implemented in any suitable manner by exemplary embodiments of the present disclosure such as via APIs, command line interface integrations, database queries, programmatic collection of display data (i.e., screen scraping), inter process communication methods, file system access, and others.

Particularly, FIG. 21 depicts how a plurality of operational messages, not limited to those depicted, are collected and then normalized, correlated, cleansed, and transformed, collectively normalized, as necessary to present event streams sufficient for the purpose of evaluating relationships. Relationships are stored and retrieved from a Relationship Database. Assets and relationships are combined by the operator to form Baselines, which are then viewed, retrieved, and or stored either directly, or by reference, in a Baseline Database. For example, the Baseline Database can be a data structure that references the relationship and asset attribute databases, or alternatively this data structure can be stored in a separate database.

In one embodiment, TrustZone membership policies may dictate how assets are automatically placed into one or more TrustZones based on asset attributes and events originating from any element as collected by the SCMS. Each asset can be assessed, as events indicating an asset attribute has changed are received by the security control software, within the context of all TrustZone membership policies so as to affect a TrustZone membership change by moving the asset from one TrustZone to another or adding the asset to another TrustZone.

Any combination and/or subset of the elements of the methods depicted herein may be practiced in any suitable order and in conjunction with any suitable system, device, and/or process. The methods described and depicted herein can be implemented in any suitable manner, such as through security control software operating on one or more computer systems, including host system 810 depicted in FIG. 27. The security control software may comprise computer-readable instructions stored in a tangible computer-readable medium (such as the memory 814 of host computer system 810) and can be executed by one or more processors (such as processor 812 of host computer system 810) to perform the methods of various embodiments.

In one embodiment, a method includes identifying one or more assets associated with one or more logical zones, establishing connections with one or more components, associating one or more security policies with one or more logical zones, detecting changes in one or more attributes for one or more assets, detecting security vulnerabilities and corrections thereto, changing zone memberships for one or more assets, modifying one or more firewall configuration settings, associating one or more compliance policies with one or more logical zones, analyzing modifications to the firewall configuration settings, determining one or more compliance levels, and displaying one or more compliance levels. The steps of this method may be implemented (in whole or in part, and in any desired order) by software operating on a computer system, such as the exemplary host computing system 810 depicted in Figure As was discussed above, embodiments of the present disclosure may be used to depict (e.g., on a display of a computing device such as a client or user device) a wide variety of information regarding network assets and network connections between such assets. Such information may be provided to users in a variety of ways, such as via the flow information graph described above. Various embodiments may also be adapted to perform network systems behavioral baselining as described for various embodiments herein.

In particular, embodiments of the disclosure may be used to select one or more operational attributes of network data connections and provide actionable intelligence to the operator (e.g., via a display as mentioned above) when deviations occur. This allows for the contextualization of deviations in network activity with the operation of various security technical controls and presents a more specific picture of those activities that may be hostile or erroneous in the network.

A computer-implemented method according to one embodiment of the present disclosure includes collecting, by a computer system, data from a plurality of different types of sources on a network; identifying, by the computer system based on the collected data, one or more compute assets, one or more operational events, data attributes associated with those assets and events; presenting, by the computer system, a graphical representation that includes representations of: the compute assets, the operational events, attributes of the assets and operational events, wherein the graphical presentation is presented via a display of a user interface in communication with the computer system, receiving, by the computer system via the user interface, input from the user that includes: a selection of one or more compute assets, one or more operational events, one or more asset attributes, one or more operational event attributes, and one or more evaluation criteria, and in response to the input from the user, creating real time or batch analyses of a plurality of operational event streams, and as a result of those analyses presenting to the user via the user interface or any appropriate messaging mechanisms, deviations in those operational event streams that represent qualitative and quantitative variations in the behavior of the computing systems relative to the baseline. Furthermore, over time, embodiments of the present disclosure can create these baselines and analyses through observation of the operational event streams.

Figure 24:
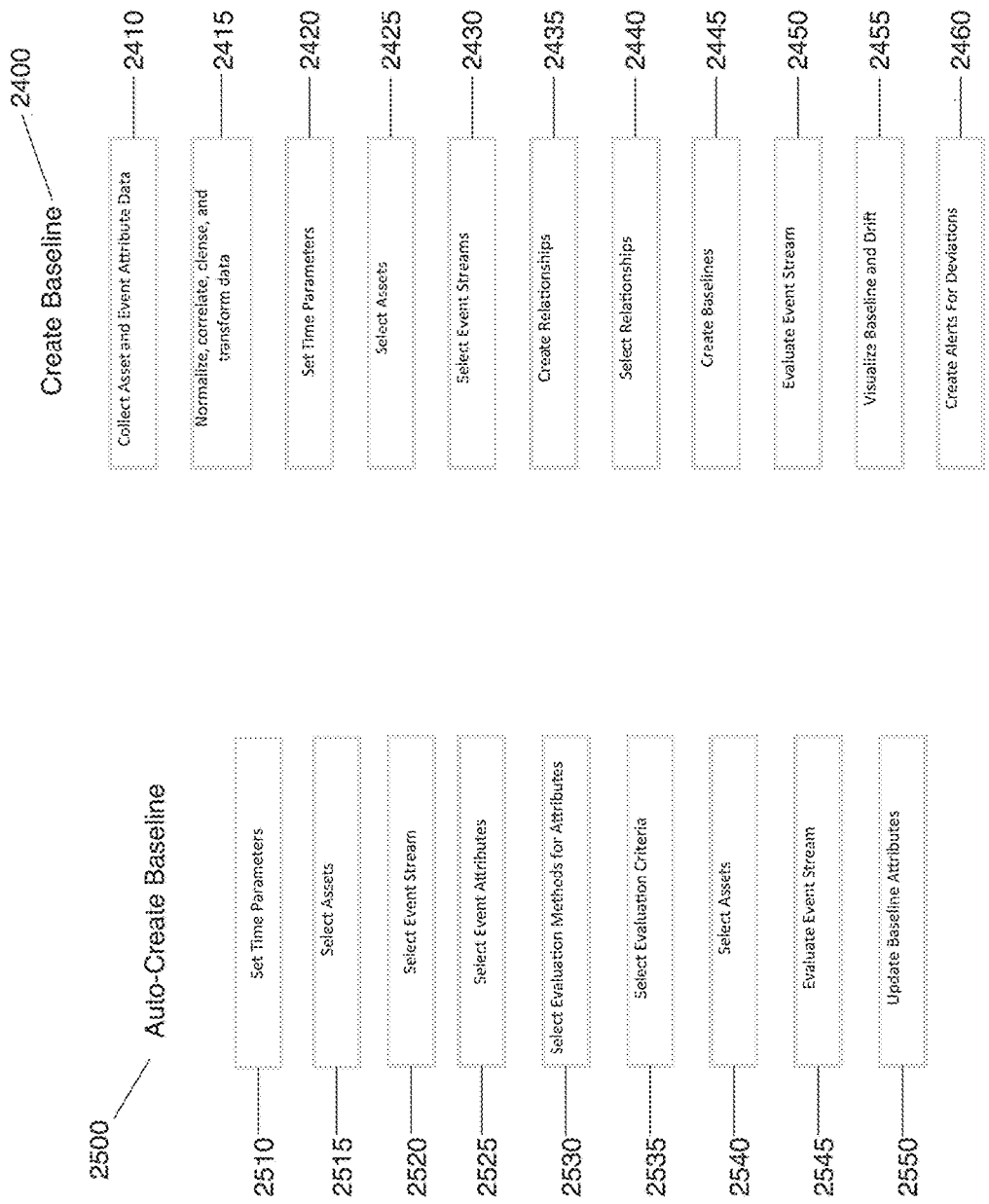
FIG. 24 depicts two flow diagrams of exemplary methods according to various embodiments of the present disclosure.

FIG. 24 depicts two exemplary processes according to various embodiments of the present disclosure. The create baseline (2400) method includes the collection of asset and event data and placing it into appropriate attributes (2410), performing various normalizations, correlations, cleansing, and transformations on the data (2415), setting temporal boundaries and conventions for analysis (2420), the selection of assets (2425), the selection of event streams (2430), the creation of relationships (2435), the selection of relationships (2440), the creation of baselines (2445), evaluation of the event streams in accordance with the baseline (2450), visualization of baselines and deviations therefrom (2455), and the creation of alerts for identified deviations (2460). The steps of method 2400 may be implemented (in whole or in part, and in any desired order) by software operating on a computer system, such as the exemplary host computing system 810 depicted in FIG. 27 (discussed further below).

In one embodiment, asset and event data may be collected (2410) from a plurality of different sources in accordance with event collection methods such as described in International Publication No. WO/2016/036485, published Mar. 10, 2016, and entitled "Systems and Methods for Network Analysis and Reporting", which is hereby incorporated by reference in its entirety.

In one embodiment, normalization of event data is done in accordance with methods as described in U.S. Patent Application Pub. No. US 2016/0072831, published Mar. 10, 2016, and entitled "SYSTEMS AND METHODS FOR NETWORK ANALYSIS AND REPORTING", which is hereby incorporated by reference in its entirety.

In one embodiment, baselines are evaluated based on temporal boundaries which may include time boxed or free running analyses. For example, referring to FIG. 28, a free running evaluation period may be determined via user input such as the marking the evaluation period by arbitrarily selecting a start and then a stop time, by selecting a button, or by entering predefined periods of arbitrary or time aligned boundaries, for example "evaluate for the next hour". The operator may chose to evaluate a baseline for a fixed period of time like an hour, day, week or month.

Evaluation periods may also be time boxed consisting of time periods consisting of any arbitrary number of predefined time periods such as: seven days, thirty days. Periods or timelines may be subdivided into sub-timelines to provide for variation within a timeline. With this method, each subdivision with the smallest duration is the primary unit of evaluation with the total evaluation for the total time period consisting of a set of evaluations of the duration of the primary unit. With this method, deviation from a baseline can be derived based on deviations from activity occurring in primary units with similar ordinal position within divisions of a higher duration, with the process continuing for each division and subdivision.

Figure 28:
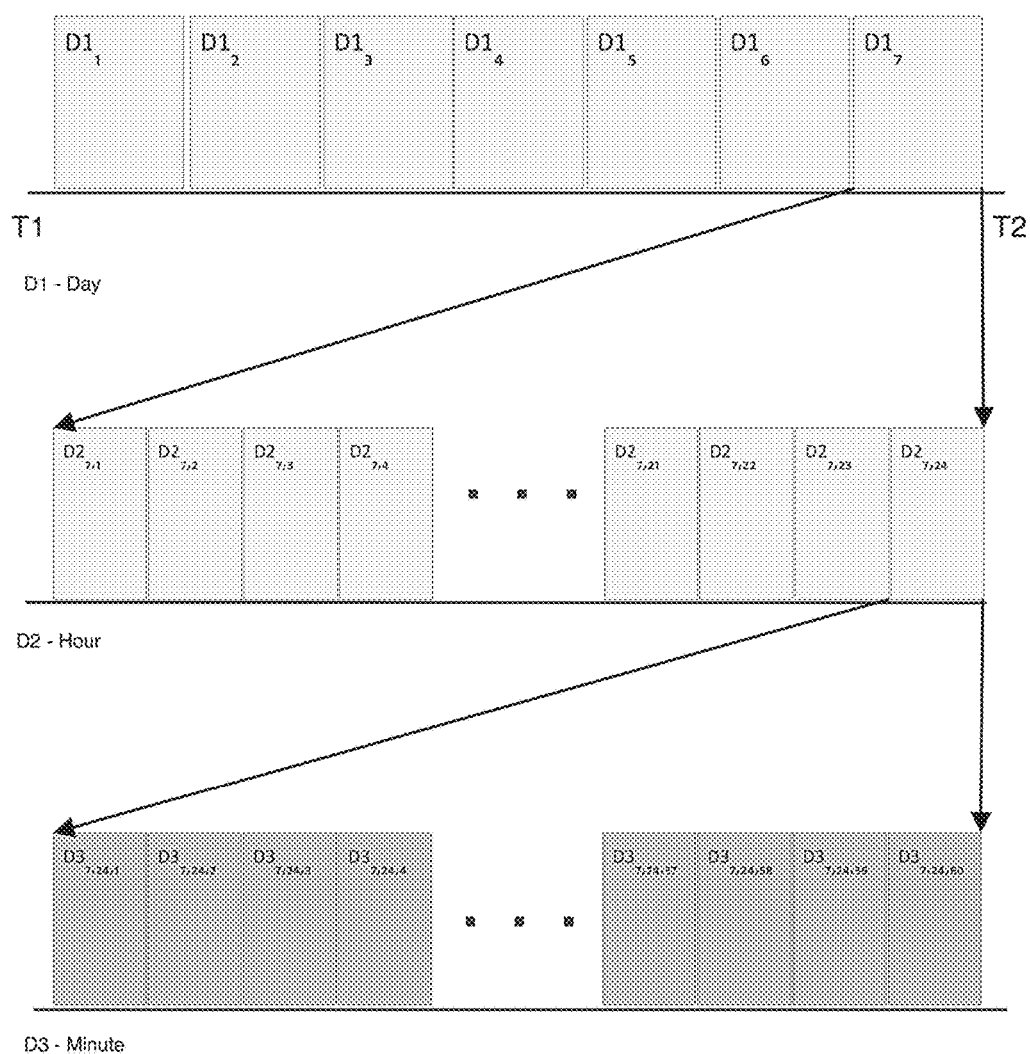
FIG. 28 depicts an exemplary temporal evaluation of baselines, according to one embodiment. The illustrated "Free Running" evaluation period consists of the period between times T1 and T2. Also illustrated in FIG. 28 is a time boxed evaluation period consisting of seven divisions of time D1 consisting of a day. Depicted are two levels of subdivisions of time D1, D2 consisting of an hour and D3 consisting of a minute.

For example, referring to FIG. 28, the seven divisions of time D1, one day, may represent a week. Each day of the week may be further subdivided into hours, with each hour being subdivided into minutes. Because network traffic and computer usage may vary based on cycles occurring within the evaluation period, such as the business week, this method may be used to compare baselines that capture deviations between traffic on Monday mornings between 8am and 9pm, or daily traffic during business hours, and/or deviations from working hours and non-working hours for employees, or deviations that occur on any partition of the temporal space (e.g., deviations for the minute 01:01 from on Sunday compared to the same minute on a different Sunday).

Figure 29:
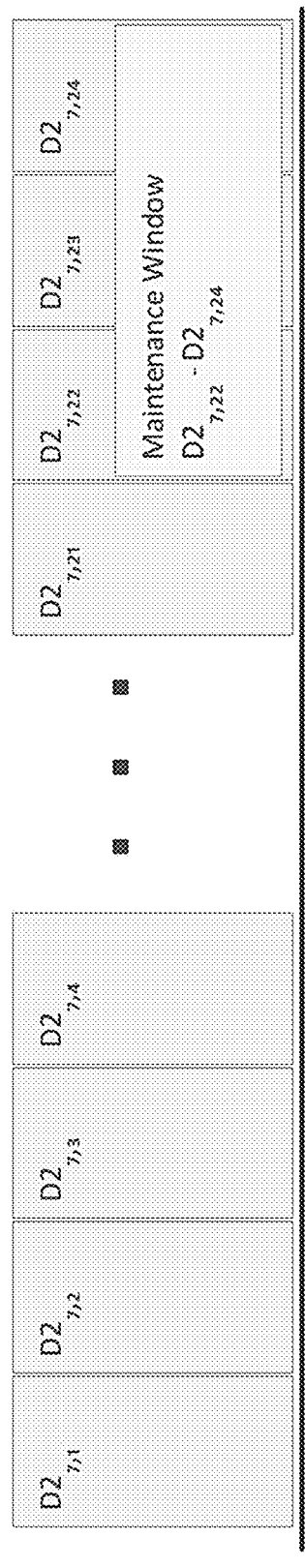
FIG. 29 depicts a time boxed evaluation period with named overlay subdivisions, according to one embodiment.

Temporal periods may also have named overlays specifically identifying divisions. For example, referring to FIG. 29, consider a timeline of one calendar week. A three hour window between 21:00-24:00 on the seventh day (Saturday) may represent a maintenance window where certain events may be expected to occur that only occur during this time period during the week. The identification of such events during the remaining time in the week would be considered a deviation.

In one embodiment, in the context of the current disclosure, durations, divisions, subdivision, and named overlays are presented to the user based on standard divisions of the calendar and the clock, and the user may specify named overlays based on any start and stop time. The setting of time parameters (2420) presents the user with various time configuration methods to identify periodic, periodic repeating, sub-timelines, sub-timeline identifiers, and free running operation of the system.

In one embodiment, the selection of assets (2425) can be performed as described in U.S. Patent Application Pub. No. 2014/0359749, published Dec. 4, 2014, and entitled "Systems and Methods for Dynamic Network Security Control and Configuration", which is hereby incorporated by reference in its entirety, and may be done with any type of conditional logic based on combinations of queries upon asset and TrustZone attributes.

Various event streams may be selected for evaluation by relationships in the system (2430). For example, in one embodiment of the current disclosure, the operator may chose to create relationships (2435) that evaluate event attributes from the specific event type called NetFlow. In which case these relationships would be associated by the system to all events where the Event Type="Netflow". As attributes are chosen, the appropriate event streams are presented to the operator for inclusion.

Method 2400 further includes the creation of relationships (2430). In one embodiment, relationships in the context of the present disclosure represent a set of attributes derived from asset attributes and or event attributes that are evaluated by the system by various mathematical and other methods including but not limited to: set theory, statistical analysis, probabilistic graphical models, vector analysis, and any appropriate evaluation for the data types, in accordance with known and appropriately contrived data typologies (e.g. Chrisman's Typology), which the attributes contain, either temporally or instantaneously and either singly or in combination.

In one embodiment, relationships may include the analysis of one or multiple attributes, and may include the analysis of multiple attributes simultaneously, taken collectively as a vector or vectors. The relationship consists of the identified attributes and corresponding evaluations or evaluators that represent the processing performed on the attributes from the event (e.g., FIG. 23 shows various examples of evaluations for certain attributes). Therefore, as an example, a first relationship may consist of an attribute and an evaluator, and a second relationship may identify the same attribute but a different evaluator.

For example, in one embodiment of the present disclosure, FIG. 23 depicts a graphic representation of an event of type NetFlow with it's associated attribute (identified in the box labeled "Event Data"). Also included in FIG. 23 is a table depicting several different evaluations for each attribute that may be performed within a relationship that is processing events of type NetFlow. FIG. 23 includes simple evaluations based on simple data attributes classification schemes.

In one embodiment, in the context of the current disclosure, complex combinatory attributes based on multiple simple attributes may be combined into vectors, analyzed as clusters, or analyzed sequentially via vector analysis, Bayesian Networks, Markov Networks, Dynamic Bayesian networks, K-Means Clustering, K-Nearest Neighbor, or any appropriate machine learning algorithm with or in either supervised or un-supervised analysis as appropriate in either first run or based on previous analysis on like data.

A series of examples now presented below illustrate how the method of 2400 is implemented within various embodiments of the present disclosure.

Referring to FIG. 7 (which relates to defining a baseline from a set of assets and a set of relationships), the operator (e.g., a user of host system 810 in FIG. 27) is presented with a set of assets obtained and defined by the system via methods, for example, as discussed in more detail in U.S. Patent Application Pub. No. 2014/0359749, published Dec. 4, 2014, and entitled "Systems and Methods for Dynamic Network Security Control and Configuration", which is hereby incorporated by reference in its entirety. Utilizing logical operators and asset attributes (e.g., as entered via a user interface on a display of host system 810), the operator selects or defines a set of assets, in this example based on "Name=Z1Asset1 OR Name=Z4Asset6". This logical expression would identify two assets.

The operator then selects an event stream, represented by the table Set of Events E. This table is representative of the appropriate event stream that corresponds to the relationships and is meant to illustrate that a sequence of such events will be evaluated upon instantiation of the baseline. The operator is then presented with a set of existing relationships that have already been created. These could also be created by the user via similar methods. Using a similar logical selection process the operator selects the relationship based on the relationship having two text strings "Z1Asset1" AND "Z4Asset6" contained in the relationship. This may be implemented by any appropriate attribute or value matching mechanism. With this logical selection the relationship named Relationship 3 is selected. The user saves the baseline such that it contains or refers to the selected assets, the event stream, and the relationship (note that, for example, a "save" button can be used by the user to initiate saving this data, but this button is not shown in the figures).

In one embodiment, in accordance with method 2460, the user is presented with an alert policy which allows them to define whether or not to generate alert messages (e.g., displayed on the host system and/or a client device) and appropriate alert throttling parameters. An example is an alert policy that contains information as described above plus a list of email recipients for the alerts should an operator want to use email for email notifications. Note that, in the asset selection process, multiple assets may be included in a baseline, and multiple relationships may also be selected as discussed below.

Referring to FIG. 8 (which relates to evaluating a baseline for drift), the baseline elements are illustrated and include the selected assets, the relationship and the event stream. Upon instantiation of the baseline, saving it and therefore submitting it to the system for evaluation, the system will then start evaluating the event stream. This is an example of an on-the-fly instantiation. This implies that the operator saved the baseline "now" at time T0 and the event stream represents a stream of events occurring at or after time T1, where T1>T0. Furthermore, the event stream would be continuous, representing a sequence of such collected events, each event occurring at times>T0.

In the depiction, to illustrate the evaluation of the baseline, only four events, that occur at times T1-T4 are shown. The events are evaluated one by one, consistent with method 2450 and each event is evaluated based on the evaluators in the relationship Relationship3. When the event at time T4 is evaluated, the Dest Asset and Dest Port attributes match the evaluations, but Source Asset does not. The symbol "=" or equal sign here is evaluated like "is in the set", so embodiments of the present disclosure can also evaluate event attributes based on a list defined in the relationship as is explained below (e.g., see Relationship3 in FIG. 13).

At the bottom of FIG. 8 two different visualizations of the baseline are presented. The first demonstrates that visualizations may present multiple events. The second shows how visual elements of the present disclosure may represent consolidated or summarized data in the form of lines or nodes in topology graphs. Both of these depictions illustrate method 2455. An example of a topology user interface that may be used for such topology graphs is described in International Publication No. WO/2016/036485, published Mar. 10, 2016, and entitled "Systems and Methods for Network Analysis and Reporting", which is hereby incorporated by reference in its entirety Additionally, per a selected policy the system may also generate alert messages that contain or reference the baseline and the deviating events.

In an alternate example, referring to FIG. 9, the operator is presented with a set of assets obtained and defined by the system. An example of asset collection that may be used for such asset selection is described in U.S. Patent Application Pub. No. 2014/0359749, published Dec. 4, 2014, and entitled "Systems and Methods for Dynamic Network Security Control and Configuration", which is hereby incorporated by reference in its entirety. Utilizing logical operators and asset attributes, the operator selects or defines a set of assets (e.g., using a user interface presented on a display). This selection in this example is based on "Group=TrustZone1 OR Group=TrustZone4". This logical expression would identify four assets as shown. Alternately, embodiments of the present disclosure provide additional querying mechanisms based on different asset or event attributes based on appropriate data types and evaluations.

For example, in FIG. 9 alternate expressions are presented, "IP=192.168.1.0.24 OR IP=10.10.10.0/24" and "Name in Set A where NAME in [Z1Asset1, Z1Asset2, Z4Asset6, Z4Asset7]". The latter of the foregoing is functionally equivalent to the Group evaluation because those assets in the set represent all members of the following TrustZones: TrustZone1 and TrustZone4. The result of all selections is the set of assets Z1Asset1, Z1Asset2, Z4Asset6, and Z4Asset7. When utilizing grouping constructs such as TrustZones, embodiments of the present disclosure may visualize such selections based on TrustZone membership as depicted at the bottom of FIG. 9.

FIG. 10 depicts an event stream as represented by the table "Set of Events E", which represents an alternate stream of events of type NetFlow. In this case more data attributes from the event are included for evaluation. The operator is presented with four relationships that have already been created for this event stream (e.g., created by the system in advance of the user's current selection process), and the operator selects a relationship based on the logical operation "Src TZ=TrustZone4 AND Dest TZ=TrustZone1", which results in the selection of Relationship4.

FIG. 11 depicts the resulting baseline consisting of four assets (Z1Asset1, Z1Asset2, Z4Asset6, Z4Asset7) and one relationship (Relationship4). As in the previous example, the user instantiates the baseline and the system starts evaluating the event stream. The event stream is depicted in the table in FIG. 11. All events up to the event at time T7 evaluate positively with respect to Relationship 4.

At time T8 an event is evaluated that fails the evaluation for the following: Src TZ, Dest TZ, and Dest Port. This event is said to deviate in three dimensions from the baseline. A possible visualization presented by the present disclosure is presented at the bottom of FIG. 9 showing the deviation with topology lines (which may be, for example, red in color) and node border coloring.

In an alternate example, referring to FIG. 12, the operator is presented with a set of assets obtained and previously-defined by the system. An example of asset collection that may be used for such asset selection is described in U.S. Patent Application Pub. No. 2014/0359749, published Dec. 4, 2014, and entitled "Systems and Methods for Dynamic Network Security Control and Configuration", which is hereby incorporated by reference in its entirety. Utilizing logical operators and asset attributes the operator selects or defines a set of assets. In this example based on "Group=TrustZone3 OR Group=TrustZone2 OR Group=TrustZone1". Based on the asset universe in this example, this logical expression would identify four assets as shown, which are considered to be selected assets.

Figure 13:
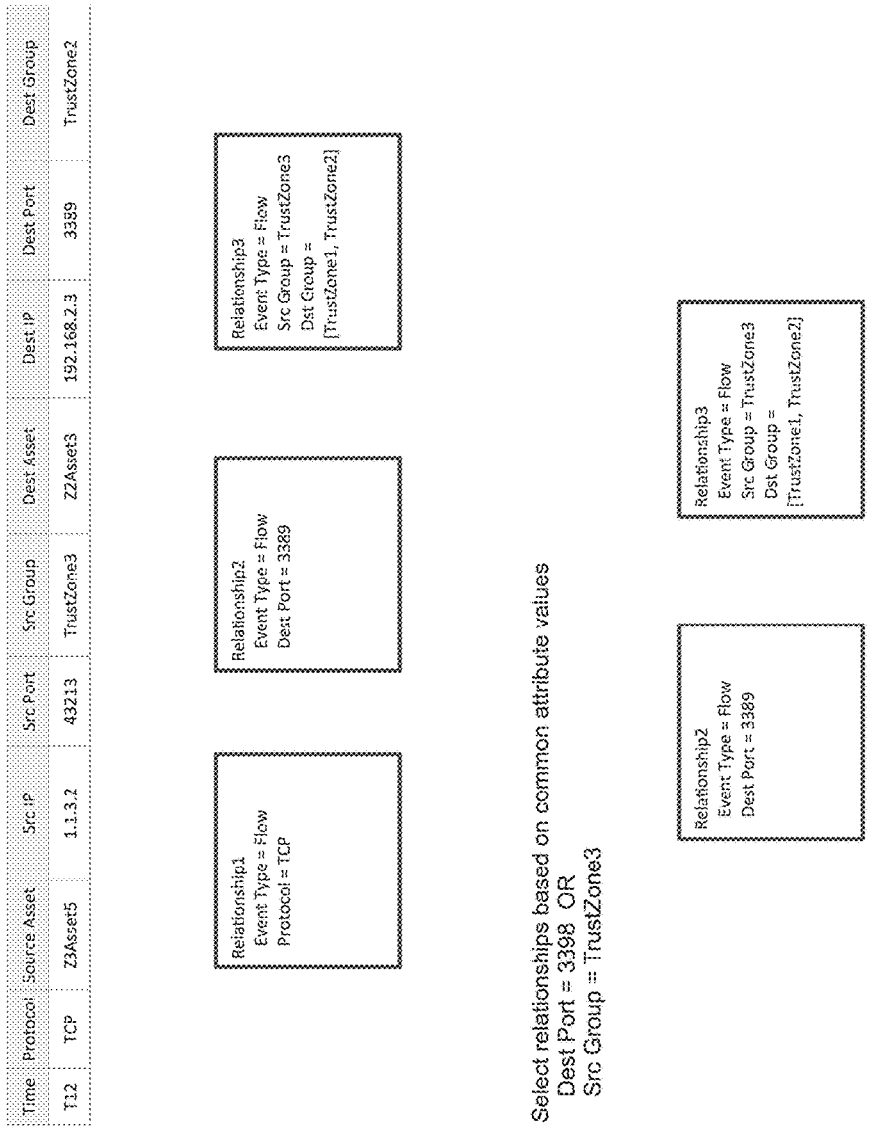
FIG. 13 depicts an event stream consisting of a single event and a set of relationships relating to the event stream, according to one embodiment. The relationship selection process is shown based on logical operations where the operator selects two relationships to be evaluated in the baseline. This figure also demonstrates how relationships may contain attributes that are compound data structures such as the set DST Group.

FIG. 13 depicts an event stream in the form of a single event of type NetFlow, although this is representative of the event stream and not meant to be limiting. In this example the event stream has three defined relationships. This time the operator selects the relationship based on the logical expression "Dest Port=3389 OR Src Group=TrustZone3". This logical expression identifies two of the three relationships: Relationship2 and Relationship3. The operator selects both relationships for inclusion into the baseline and instantiates the baseline as discussed above.

FIG. 14 depicts the baseline including the four assets and two relationships. The event stream is evaluated as before. Each event in the stream is evaluated against both Relationship2 and Relationship3. The events at times T13 and T14 deviate from the baseline because the Dest Port=22 and is not "in the set" 3389 as defined in Relationship2. A visualization of the baseline and the deviations are depicted at the bottom of FIG. 14. In the visualization lines depicting the connections between two groups are one color (e.g., black) if the connections they represent do not deviate from or fail the evaluation in the relationship. If the connections between the groups deviate or fail the evaluation in the relationship, then the lines depicting the connections would be a different color (e.g., red).

In an alternate example, referring to FIG. 15, the operator is presented with a set of assets obtained and defined by the system. An example that may be used is described in U.S. Patent Application Pub. No. 2014/0359749, published Dec. 4, 2014, and entitled "Systems and Methods for Dynamic Network Security Control and Configuration", which is hereby incorporated by reference in its entirety. Utilizing logical operators and asset attributes the operator selects or defines a set of assets. In this example based on "Group=TrustZone1". Based on the asset universe in this example, this logical expression would identify two assets as shown.

In FIG. 16 the operator selects an event stream consisting of authentication events from an Active Directory Server. Three existing relationships exist in the system for this event stream. Relationships can either be provided by default based on previous analysis of connection models (e.g., instantiated in the present disclosure a priori) or were previously created by an operator through a process of selecting attributes and evaluations. Relationships consist of attributes and evaluations like those, for example, described in FIG. 23. Using logical operations the operator selects the relationship based on "Name=Relationship3", thus explicitly selecting Relationship3. Relationship3 contains the following attributes and evaluators: "Event Type=Auth", "Group=TrustZone1", and "User=[alice, bob, charles]". As in the previous examples, this relationship contains set data.

Each evaluation is detailed as follows: "Event Type=Auth" means that for each event of Type "Auth", the event stream depicted are all events of Type Auth. "Group=TrusZone1" means that for each event of Type Auth pertaining to an asset in TrustZone1 or any asset with "Group =TrustZone1". If the User indicated in the authentication event is in the set [alice, bob, charles], then the event is within the baseline. As described above, the operator instantiates the baseline. Instantiating the baseline connects the evaluations to an event stream and starts the evaluation process either at the time of instantiation (e.g., starts the evaluation of all subsequent events) or on a previously stored set of events based on the temporal settings for the baseline.

FIG. 17 depicts the baseline with the selected assets and relationships. For the event stream shown in FIG. 17, the event at time T15 deviates from the baseline because the User attribute of this event equals "dan". The "User=dan" attribute value pair fails the evaluator "User=[alice, bob, charles]". This example shows how embodiments of the present disclosure can evaluate different type of events streams, in this case a unary event pertaining to a single asset, whereas in the previous examples the events were binary in that they pertained to two assets as events of type NetFlow. It can be said that in this case the two pertinent assets were the Active Directory Server "ADSrv1", and each individual asset defined in the baseline. This is optional (i.e., not necessary), but is not excluded by possible embodiments of the current disclosure.

At the bottom of FIG. 17 one possible visualization produced by embodiments of the current disclosure is depicted. Event streams of this type pertain to nodes in topology graphs and therefore color shading depicting the deviation is provided on the edge of the asset depiction (e.g., a colored bordering is used on the perimeter of a rectangle or other shape presented to an operator).

Alternate visualizations may include simply shading or adding iconography to group structures such as TrustZones in any/all graph depictions, even those pertaining to binary events such as NetFlow evaluations. This indicates persistence of all drifts from baseline in the visualization regardless of whether or not a specific baseline is selected for visualization.

In an alternate example, referring to FIG. 18, the operator is presented with a set of assets obtained and defined by the system. An example that may be used is described in U.S. Patent Application Pub. No. 2014/0359749, published Dec. 4, 2014, and entitled "Systems and Methods for Dynamic Network Security Control and Configuration", which is hereby incorporated by reference in its entirety.

Utilizing logical operators and asset attributes, the operator selects or defines a set of assets. In this example based on "Group=TrustZone1". Based on the asset universe in this example, this logical expression would identify the two assets as shown. In this example different attributes for the assets are depicted. Along with Name and Group attributes, a new attribute type called "Asset Ports" is shown. These attributes are assigned through interaction with a vulnerability scanner. As depicted, not all assets have these attributes assigned, indicating that the assets have never been scanned.

FIG. 19 depicts an event stream from a set of vulnerability scanners "Appliance1" and "Appliance2". The event shows the result of a simple port scan which identifies listening services by port number. As before, the operator is presented with a set of existing relationships and selects one based on the logical operation "Detected Ports", indicating she wants to select all relationships that have the attribute "Detected Ports" (i.e., select all relationships having this attribute for any value of the attribute). Here, the relationship Relationship3 is selected.

In this relationship, there is an evaluator "Detected Ports[ ]=Asset Ports[ ]". This evaluator is populated at instantiation time for all assets based on the values of the Asset Ports attribute for each asset in the baseline. Alternate embodiments of the present disclosure may prompt the operator indicating that Asset Port assignments exist for selected assets and present the operator with a visualization or list of the existing Asset Port values for review and modification prior to instantiating the baseline. In the case where this attribute is not set for an asset, the evaluator would have the option to set this attribute to any appropriate value including null, or alternately launch a scan via other methods such that the asset attribute would be set via other methods, for example such as those described in U.S. Pat. App. Pub. No. US 2016/0072815, published Mar. 10, 2016, entitled "SYSTEMS AND METHODS FOR CREATING AND MODIFYING ACCESS CONTROL LISTS," the entire disclosure of which application is hereby incorporated by reference. As before, the operator instantiates the baseline.

FIG. 20 depicts the baseline consisting of the two assets and the relationship. The event at time T26 in the event stream deviates from the baseline because at time T26 the scanning appliance "Appliance 2" detects three open ports [443, 3389, 37337] on the asset Z1Asset1. The baseline has the "Detect Ports" attribute defined as [443, 3389] for Z1Asset1 as was defined dynamically at instantiation time.

At the bottom of FIG. 20, one exemplary visualization produced by embodiments of the current disclosure is depicted. Event streams of this type pertain to nodes in topology graphs and therefore color shading depicting the deviation is on the edge of the asset depiction. Alternate visualizations may include simply shading or adding iconography to group structures such as TrustZones in any/all graph depictions, even those pertaining to binary events such as NetFlow evaluations. This indicates persistence of all drifts from baseline in the visualization regardless of whether or not a specific baseline is selected for visualization.

Various embodiments are now discussed below that include various references to the figures above for purposes of non-limiting, exemplary illustration. In one embodiment, a method comprises: storing, in an asset attribute database, information regarding assets, wherein each asset comprises at least one attribute (e.g., Name in FIG. 7 for Asset1); storing, in a relationship database, information regarding relationships, wherein each relationship comprises at least one attribute (e.g., Protocol of Relationship1 in FIG. 7, or Port of Relationship2 in FIG. 7); selecting, from the asset attribute database, assets based on at least one attribute value (e.g., selecting assets having a value for a Name attribute of Z1Asset1 or Z4Asset6 in FIG. 7 based on the logical OR operator); selecting, from the relationship database, one or more relationships based on at least one attribute value, the selected relationships including a first relationship (e.g., selecting relationships having attribute values of both Z1Asset1 and Z4Asset6 based on the logical operator AND in FIG. 7); creating a baseline, wherein the baseline comprises the selected assets and the selected relationships (e.g., Asset1 and Asset4, and Relationship3 in FIG. 7); connecting a first event stream (e.g., sequence of events for times T1 to T4 in FIG. 8) to the baseline, wherein the first event stream comprises a set of events, and each event comprises attributes (e.g., the attribute Source Asset of the event stream in FIG. 8; or the attribute User having a value of "dan" at time T15 in FIG. 17); and detecting a drift from the baseline, wherein the drift is determined using the first event stream and is based on a failure of at least one attribute value in a first event of the first event stream to match at least one attribute value of the first relationship (in this embodiment, the evaluation is a match, and the match fails the evaluation in the relationship) (e.g., in FIG. 7 at time T4, the evaluation of the evaluator "Source Asset=Z4Asset6" of Relationship3 fails since the value of Z4Asset7 for Source Asset in the event stream does not match the value specified in the SourceAsset evaluator). Another example of an evaluator used to perform an evaluation is the evaluator User=[alice, bob, charles] of Relationship3 in FIG. 17.

In one embodiment, connecting the first event stream can be performed by programming that submits the data structure contained in each event to the software that will perform the evaluation.

In one embodiment, detecting the drift from the baseline can be performed by programming that evaluates the data in the event via any appropriate technique, including but not limited to mathematical, set theory, or machine learning methods.

In one embodiment, the method further comprises recording, into at least one database, information from a plurality of event streams including the first event stream.

In one embodiment, the creating the baseline comprises selecting assets based on attribute values, and selecting relationships based on attribute values.

In one embodiment, the method further comprises defining an alert policy, and in response to detecting the drift, generating an alert based on the alert policy.

In one embodiment, the method further comprises evaluating each event of the first event stream based on evaluations corresponding to attributes in the selected relationships.

In one embodiment, the first relationship comprises a first attribute and a first evaluation corresponding to the first attribute, and detecting the drift further comprises evaluating event data for the first attribute from a first event in the event stream, and determining that the evaluated event data fails the evaluation.

In one embodiment, the first event comprises data to be evaluated using the selected relationships, and wherein the data is at least one of: a source port, a destination port, a source asset, a destination asset, a source group, or a destination group.

In one embodiment, each of the selected relationships references at least one event stream having an event type, and wherein the event type for each event stream is flow (e.g., Event Type=Flow for Relationship3 in FIG. 7), authentication, or port scan.

In one embodiment, an event type of the first relationship is authentication, and the first relationship includes a user attribute corresponding to a set of authorized users.

In one embodiment, detecting the drift is based at least in part on evaluation of an event including a logon by a user that is not in the set of authorized users.

In one embodiment, each selected relationship references an event stream having an event type of port scan, and each selected relationship comprises a detected ports attribute with attribute values that are determined when the selected relationship is instantiated.

In one embodiment, the first relationship comprises an attribute with a value corresponding to a first group of assets, and a first asset is included in the selected assets based on a selection of assets having an attribute value matching the first group.

In one embodiment, each attribute of each selected relationship is an asset attribute, an event attribute, an attribute for which a value is derived using at least one value from evaluation of an asset attribute or an event attribute (e.g., Attribute5 of FIG. 6, which represents a calculated running average number of bytes per IPFix record), or an attribute for which a value is derived using at least one value from evaluation of each of an asset attribute and an event attribute (e.g., the average byte count of IPFix records associated with an asset may be stored as an attribute value over time and compared with running byte counts of observed connections via mathematical means such as mean, mode, or average).

In one embodiment, the selected relationships are selected based on specifying, using a logical operator, a value of an attribute that identifies a group of assets, wherein each relationship including a group attribute equal to the value is selected as depicted in FIG. 10.

In one embodiment, each event comprises a time attribute having a value based on a time that the event occurred (e.g., a value corresponding to Time T1 in FIG. 7), and wherein an evaluation of the event corresponding to at least one attribute of a selected relationship comprises comparing the time to one or more temporal ranges.

In one embodiment, each asset of the selected assets comprises an asset port attribute (e.g., Asset Ports of Asset1 in FIG. 20), the first event stream is provided from a set of vulnerability scanners (e.g., Appliance1 and Appliance2 in FIG. 20), and each event of the first event stream includes data from a port scan that identifies port numbers for detected ports (e.g., Detected Ports of the event stream for Time T24 to T26).

In one embodiment, attribute values for detected port attributes of each of the selected relationships are based on values for asset port attributes of the selected assets when the respective selected relationship is instantiated, and wherein detecting the drift is based on a failure of detected ports in the first event for a first asset of the selected assets to match detected ports for the first asset in the first relationship in the baseline as depicted in FIG. 20.

Figure 6:
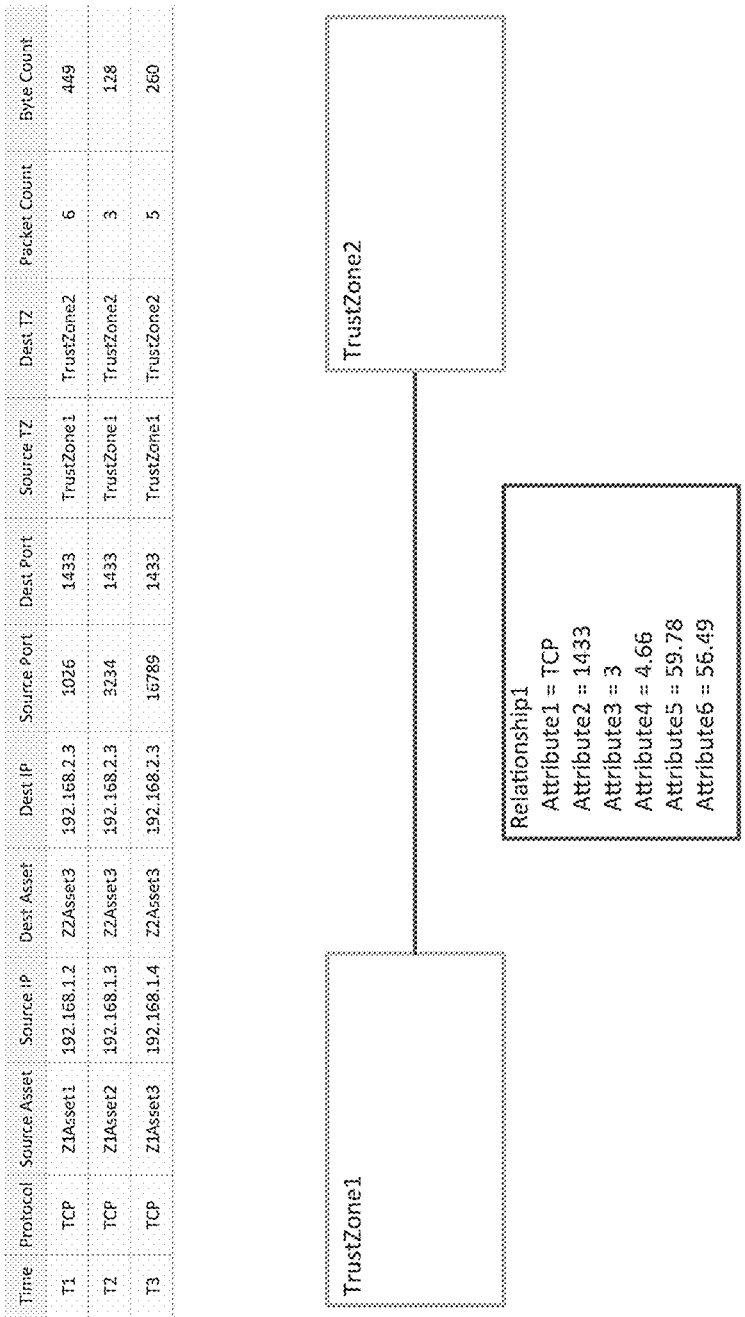
FIG. 6 depicts multiple operational events, in this case normalized IPFix network flow events, and how relationships may have derived data based on mathematical evaluation of a stream of data elements from the operational events (in this case summation and averaging), according to one embodiment.

In one embodiment, the first relationship comprises a derived attribute, the derived attribute has a value determined using data from a first plurality of events each having an event type of flow (e.g., Byte Count from the table of FIG. 6, representing the number of data bytes in the connection represented by the event of type IPFix), and the data from the first plurality of events is used in a mathematical evaluation corresponding to an attribute of the first relationship to calculate the value of the derived attribute (e.g., Attribute6 of Relationship1 of FIG. 6, depicting the average data bytes per flow).

In one embodiment, the first relationship references an event stream of a first event type and the first relationship further comprises a first attribute and a second attribute, wherein the first relationship evaluates the first attribute to provide a first value, and evaluates the second attribute to provide a second value, and wherein the first value and second value are mathematically derived from data from events of the first event type in the first event stream.

In one embodiment, the selected relationships further comprise a second relationship that references a second event stream of a second event type different from the first event type, and the second relationship further comprises a third attribute and a fourth attribute, wherein the second relationship evaluates the third attribute to provide a third value, and evaluates the fourth attribute to provide a fourth value, wherein the third value and fourth value are each mathematically derived from data from events of the second event type in the second event stream, wherein an evaluation of the second relationship comprises a determination whether data from an event in the second event stream complies with the evaluation, and wherein the first relationship and the second relationship are used to detect the drift based on evaluations for attributes in both the first and the second relationships.

Figure 27:
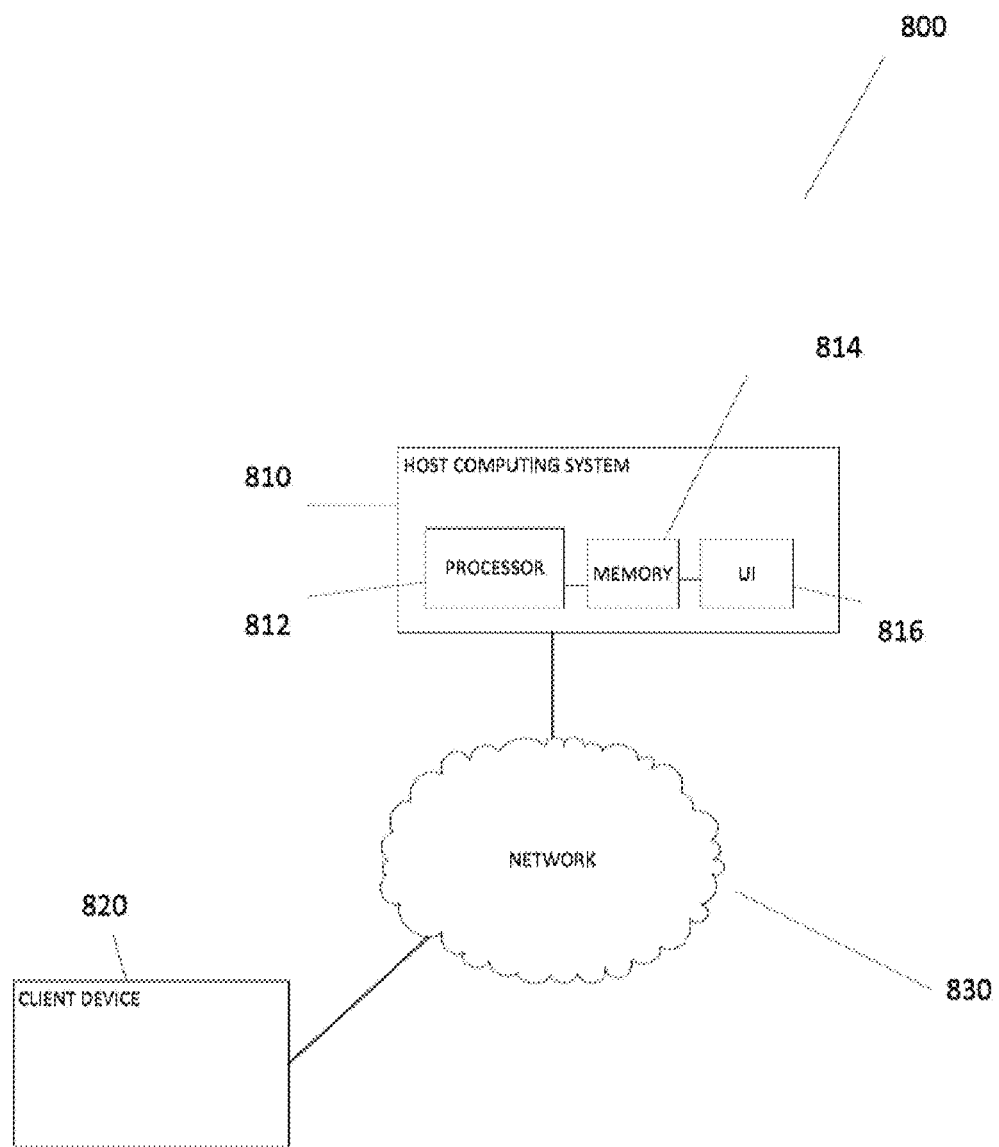
FIG. 27 is a block diagram of an exemplary system according to various embodiments of the present disclosure.

FIG. 27 shows a block diagram of a system which may be used in conjunction with various embodiments. While FIG. 27 illustrates various components of a computer system, it is not intended to represent any particular architecture or manner of interconnecting the components. Other systems that have fewer or more components may also be used.

In FIG. 27, the system 800 includes a host computer system 810 comprising a processor 812, memory 814, and user interface 816. Host computer system 810 may include any number of different processors, memory components, and user interface components, and may interact with any other desired systems and devices in conjunction with embodiments of the present disclosure.

The functionality of the host system 810, including the methods depicted in FIG. 24, (in whole or in part), may be implemented through the processor 812 executing computer-readable instructions stored in the memory 814 of the system 810. The memory 814 may store any computer-readable instructions and data, including software applications and embedded operating code.

The functionality of the host system 810 or other system and devices operating in conjunction with embodiments of the present disclosure may also be implemented through various hardware components storing machine-readable instructions, such as application-specific integrated circuits (ASICs), field-programmable gate arrays (FPGAs) and/or complex programmable logic devices (CPLDs). Systems according to aspects of certain embodiments may operate in conjunction with any desired combination of software and/or hardware components. The processor 812 retrieves and executes instructions stored in the memory 814 to control the operation of the system 810. Any type of processor, such as an integrated circuit microprocessor, microcontroller, and/or digital signal processor (DSP), can be used in conjunction with embodiments of the present disclosure. A memory 814 operating in conjunction with embodiments of the disclosure may include any combination of different memory storage devices, such as hard drives, random access memory (RAM), read only memory (ROM), FLASH memory, or any other type of volatile and/or nonvolatile memory. Data can be stored in the memory 814 in any desired manner.

The host system 810 includes a user interface 816 may include any number of input devices (not shown) to receive commands, data, and other suitable input from a user, as well as any number of output devices (not shown) to provides the user with data, notifications, and other suitable information. Typical I/O devices may include mice, keyboards, modems, network interfaces, printers, scanners, video cameras and other devices.

The host system 810 may communicate with one or more client devices 820 and other systems and devices in any desired manner, including via network 830. The client device 820 may include any computing device that operates in conjunction with systems and methods of the present disclosure. The client device 820 may be, or include, a laptop computer, a desktop computer, a mobile subscriber communication device, a mobile phone, a personal digital assistant (PDA), a tablet computer, an electronic book or book reader, a digital camera, a video camera, a video game console, and/or any other suitable computing device.

The network 830 may include any electronic communications system or method. Communication among components operating in conjunction with embodiments of the present disclosure may be performed using any suitable communication method, such as, for example, a telephone network, an extranet, an intranet, the Internet, point of interaction device (point of sale device, personal digital assistant (e.g., iPhone®, Palm Pilot®, Blackberry®), cellular phone, kiosk, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Systems and devices of the present disclosure may utilize TCP/IP communications protocols as well as IPX, Appletalk, IP-6, NetBIOS, OSI, any tunneling protocol (e.g. IPsec, SSH), or any number of existing or future protocols.

Various functionality may be performed via a web browser and/or application interfacing utilizing a web browser. Such browser applications may comprise Internet browsing software installed within a computing unit or a system to perform various functions. These computing units or systems may take the form of a computer or set of computers, and any type of computing device or systems may be used, including laptops, notebooks, tablets, hand held computers, personal digital assistants, set-top boxes, workstations, computer-servers, main frame computers, mini-computers, PC servers, pervasive computers, network sets of computers, personal computers and tablet computers, such as iPads, iMACs, and MacBooks, kiosks, terminals, point of sale (POS) devices and/or terminals, televisions, or any other device capable of receiving data over a network. Various embodiments may utilize Microsoft Internet Explorer, Mozilla Firefox, Google Chrome, Apple Safari, or any other of the myriad software packages available for browsing the internet.

Various embodiments may operate in conjunction with any suitable operating system (e.g., Windows NT, 95/98/2000/CE/Mobile, OS2, UNIX, Linux, Solaris, MacOS, PalmOS, etc.) as well as various conventional support software and drivers typically associated with computers. Various embodiments may include any suitable personal computer, network computer, workstation, personal digital assistant, cellular phone, smart phone, minicomputer, mainframe or the like. Embodiments may implement security protocols, such as Secure Sockets Layer (SSL), Transport Layer Security (TLS), and Secure Shell (SSH). Embodiments may implement any desired application layer protocol, including http, https, ftp, and sftp.

Various components, modules, and/or engines may be implemented as micro-applications or micro-apps. Micro-apps are typically deployed in the context of a mobile operating system, including for example, a Palm mobile operating system, a Windows mobile operating system, an Android Operating System, Apple iOS, a Blackberry operating system and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and then communicates a detected input from the hardware to the micro-app.

As used herein, the term "network" includes any cloud, cloud computing system or electronic communications system or method which incorporates hardware and/or software components. Communication among the parties may be accomplished through any suitable communication channels, such as, for example, a telephone network, an extranet, an intranet, the Internet, point of interaction device (point of sale device, personal digital assistant (e.g., iPhone®, Palm Pilot®, Blackberry®), cellular phone, kiosk, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Systems may utilize TCP/IP communications protocols as well as IPX, Appletalk, IP-6, NetBIOS, OSI, any tunneling protocol (e.g. IPsec, SSH), or any number of existing or future protocols. Specific information related to the protocols, standards, and application software utilized in connection with the Internet is generally known to those skilled in the art and, as such, need not be detailed herein.

The various system components may be independently, separately or collectively suitably coupled to the network via data links which includes, for example, a connection to an Internet Service Provider (ISP) over the local loop as is typically used in connection with standard modem communication, cable modem, satellite networks, ISDN, Digital Subscriber Line (DSL), or various wireless communication methods. It is noted that the network may be implemented as other types of networks, such as an interactive television (ITV) network.

The system may be partially or fully implemented using cloud computing. "Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand.

Various embodiments may be used in conjunction with web services, utility computing, pervasive and individualized computing, security and identity solutions, autonomic computing, cloud computing, commodity computing, mobility and wireless solutions, open source, biometrics, grid computing and/or mesh computing.

Any databases discussed herein may include relational, hierarchical, graphical, or object-oriented structure and/or any other database configurations. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically.

Any databases, systems, devices, servers or other components of the system may consist of any combination thereof at a single location or at multiple locations, wherein each database or system includes any of various suitable security features, such as firewalls, access codes, encryption, decryption, compression, decompression, and/or the like.

Encryption may be performed by way of any of the techniques now available in the art or which may become available—e.g., Twofish, RSA, El Gamal, Schorr signature, DSA, PGP, PKI, and symmetric and asymmetric cryptosystems.

Embodiments may connect to the Internet or an intranet using standard dial-up, cable, DSL or any other Internet protocol known in the art. Transactions may pass through a firewall in order to prevent unauthorized access from users of other networks.

The computers discussed herein may provide a suitable website or other Internet-based graphical user interface which is accessible by users. For example, the Microsoft Internet Information Server (IIS), Microsoft Transaction Server (MTS), and Microsoft SQL Server, may be used in conjunction with the Microsoft operating system, Microsoft NT web server software, a Microsoft SQL Server database system, and a Microsoft Commerce Server. Additionally, components such as Access or Microsoft SQL Server, Oracle, Sybase, Informix MySQL, Interbase, etc., may be used to provide an Active Data Object (ADO) compliant database management system. In another example, an Apache web server can be used in conjunction with a Linux operating system, a MySQL database, and the Perl, PHP, and/or Python programming languages.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, Java applets, JavaScript, active server pages (ASP), common gateway interface scripts (CGI), extensible markup language (XML), dynamic HTML, cascading style sheets (CSS), AJAX (Asynchronous Javascript And XML), helper applications, plug-ins, and the like. A server may include a web service that receives a request from a web server, the request including a URL and an IP address. The web server retrieves the appropriate web pages and sends the data or applications for the web pages to the IP address. Web services are applications that are capable of interacting with other applications over a communications means, such as the Internet.

Various embodiments may employ any desired number of methods for displaying data within a browser-based document. For example, data may be represented as standard text or within a fixed list, scrollable list, drop-down list, editable text field, fixed text field, pop-up window, and the like. Likewise, embodiments may utilize any desired number of methods for modifying data in a web page such as, for example, free text entry using a keyboard, selection of menu items, check boxes, option boxes, and the like.

The exemplary systems and methods illustrated herein may be described in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, Java, JavaScript, VBScript, Macromedia Cold Fusion, COBOL, Microsoft Active Server Pages, assembly, PERL, PHP, awk, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JavaScript, VBScript or the like.

As will be appreciated by one of ordinary skill in the art, the system may be embodied as a customization of an existing system, an add-on product, a processing apparatus executing upgraded software, a stand alone system, a distributed system, a method, a data processing system, a device for data processing, and/or a computer program product. Accordingly, any portion of the system or a module may take the form of a processing apparatus executing code, an internet based embodiment, an entirely hardware embodiment, or an embodiment combining aspects of the internet, software and hardware. Furthermore, the system may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The system and method is described herein with reference to screen shots, block diagrams and flowchart illustrations of methods, apparatus (e.g., systems), and computer program products according to various embodiments. It will be understood that each functional block of the block diagrams and the flowchart illustrations, and combinations of functional blocks in the block diagrams and flowchart illustrations, respectively, can be implemented by computer program instructions.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user windows, webpages, websites, web forms, prompts, etc. Practitioners will appreciate that the illustrated steps described herein may comprise in any number of configurations including the use of windows, webpages, web forms, popup windows, prompts and the like. It should be further appreciated that the multiple steps as illustrated and described may be combined into single webpages and/or windows but have been expanded for the sake of simplicity. In other cases, steps illustrated and described as single process steps may be separated into multiple webpages and/or windows but have been combined for simplicity.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" should be construed to exclude only those types of transitory computer-readable media which were found in In Re Nuijten to fall outside the scope of patentable subject matter under 35 U.S.C. § 101.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure.

Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described exemplary embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

Changes and modifications may be made to the disclosed embodiments without departing from the scope of the present disclosure. These and other changes or modifications are intended to be included within the scope of the present disclosure, as expressed in the following claims.

What is claimed is:

1. A method, comprising:
   storing, in an asset attribute database, information regarding assets, wherein each asset comprises at least one attribute;
   storing, in a relationship database, information regarding relationships, wherein each relationship comprises at least one attribute;
   selecting, from the asset attribute database, assets based on at least one attribute value;
   selecting, from the relationship database, one or more relationships based on at least one attribute value, the selected relationships including a first relationship;
   creating a baseline, wherein the baseline comprises the selected assets and the selected relationships;
   connecting a first event stream to the baseline, wherein the first event stream comprises a sequence of events for times including a first time and at least a second time, and each event comprises attributes; and
   detecting a drift from the baseline, wherein the drift is determined using the first event stream and is based on a failure of at least one attribute value in a first event of the first event stream to match at least one attribute value of the first relationship.

2. The method of claim 1, further comprising recording, into at least one database, information from a plurality of event streams including the first event stream.

3. The method of claim 1, wherein creating the baseline comprises selecting assets based on attribute values, and selecting relationships based on attribute values.

4. The method of claim 1, further comprising defining an alert policy, and in response to detecting the drift, generating an alert based on the alert policy.

5. The method of claim 1, further comprising evaluating each event of the first event stream based on evaluations corresponding to attributes in the selected relationships.

6. The method of claim 5, wherein the first relationship comprises a first attribute and a first evaluation corresponding to the first attribute, and detecting the drift further comprises using the first evaluation to evaluate event data for the first attribute from a first event in the event stream, and determining that the evaluated event data fails the first evaluation.

7. The method of claim 6, wherein the first event comprises data to be evaluated using the selected relationships, and wherein the data is at least one of: a source port, a destination port, a source asset, a destination asset, a source group, or a destination group.

8. The method of claim 1, wherein each of the selected relationships references at least one event stream having an event type, and wherein the event type for each event stream is flow, authentication, or port scan.

9. The method of claim 8, wherein an event type of the first relationship is authentication, and the first relationship includes a user attribute corresponding to a set of authorized users.

10. The method of claim 9, wherein detecting the drift is based at least in part on evaluation of an event including a logon by a user that is not in the set of authorized users.

11. The method of claim 8, wherein each selected relationship references an event stream having an event type of port scan, and each selected relationship comprises a detected ports attribute with attribute values that are determined when the selected relationship is instantiated.

12. The method of claim 1, wherein the first relationship comprises an attribute with a value corresponding to a first group of assets, and a first asset is included in the selected assets based on a selection of assets having an attribute value matching the first group.

13. The method of claim 1, wherein each attribute of each selected relationship is an asset attribute, an event attribute, an attribute for which a value is derived using at least one value from evaluation of an asset attribute or an event attribute, or an attribute for which a value is derived using at least one value from evaluation of each of an asset attribute and an event attribute.

14. The method of claim 1, wherein the selected relationships are selected based on specifying, using a logical operator, a value of an attribute that identifies a group of assets, wherein each relationship including a group attribute equal to the value is selected.

15. The method of claim 1, wherein each event comprises a time attribute having a value based on a time that the event occurred, and wherein an evaluation of the event corresponding to at least one attribute of a selected relationship comprises comparing the time that the event occurred to one or more temporal ranges.

16. The method of claim 11, wherein each asset of the selected assets comprises an asset port attribute, the first event stream is provided from a set of vulnerability scanners, and each event of the first event stream includes data from a port scan that identifies port numbers for detected ports.

17. The method of claim 11, wherein attribute values for detected port attributes of each of the selected relationships are based on values for asset port attributes of the selected assets when the respective selected relationship is instantiated, and wherein detecting the drift is based on a failure of detected ports in the first event for a first asset of the selected assets to match detected ports for the first asset in the first relationship in the baseline.

18. The method of claim 1, wherein the first relationship comprises a derived attribute, the derived attribute has a value determined using data from a first plurality of events each having an event type of flow, and the data from the first plurality of events is used in a mathematical evaluation corresponding to an attribute of the first relationship to calculate the value of the derived attribute.

19. The method of claim 8, wherein the first relationship references an event stream of a first event type and the first relationship further comprises a first attribute and a second attribute, wherein the first relationship evaluates the first attribute to provide a first value, and evaluates the second attribute to provide a second value, and wherein the first value and second value are mathematically derived from data from events of the first event type in the first event stream.

20. The method of claim 19, wherein the selected relationships further comprise a second relationship that references a second event stream of a second event type different from the first event type, and the second relationship further comprises a third attribute and a fourth attribute, wherein the second relationship evaluates the third attribute to provide a third value, and evaluates the fourth attribute to provide a fourth value, wherein the third value and fourth value are each mathematically derived from data from events of the second event type in the second event stream, wherein an evaluation of the second relationship comprises a determination whether data from an event in the second event stream complies with the evaluation, and wherein the first relationship and the second relationship are used to detect the drift based on evaluations for attributes in both the first and the second relationships.

21. A non-transitory, computer-readable medium storing instructions that, when executed, cause a computing device to:
store, by at least one processor, information regarding assets, wherein each asset comprises at least one attribute;
store, in at least one memory, information regarding relationships, wherein each relationship comprises at least one attribute;
select assets based on at least one attribute value;
select one or more relationships based on at least one attribute value, the selected relationships including a first relationship;
create a baseline, wherein the baseline comprises the selected assets and the selected relationships;
connect a first event stream to the baseline, wherein the first event stream comprises a sequence of events for times including a first time and at least a second time, and each event comprises attributes; and
detect a drift from the baseline, wherein the drift is determined using the first event stream and is based on a failure of at least one attribute value in a first event of the first event stream to pass an evaluation of the first relationship.

22. A system, comprising:
at least one database,
at least one processor; and
at least one memory in communication with the at least one processor and storing instructions that, when executed by the at least one processor, cause the system to:
store, in the at least one database, information regarding assets, wherein each asset comprises at least one attribute;
store, in the at least one database, information regarding relationships, wherein each relationship comprises at least one attribute;
select, from the at least one database, assets based on at least one attribute value;
select, from the at least one database, one or more relationships based on at least one attribute value, the selected relationships including a first relationship;
create a baseline, wherein the baseline comprises the selected assets and the selected relationships;
connect a first event stream to the baseline, wherein the first event stream comprises a sequence of events for times including a first time and at least a second time, and each event comprises attributes; and
detect a drift from the baseline, wherein the drift is determined using the first event stream and is based on a failure of at least one attribute value in a first event of the first event stream to match at least one attribute value of the first relationship.

* * * * *